United States Patent
Gates

(10) Patent No.: US 11,630,603 B1
(45) Date of Patent: Apr. 18, 2023

(54) HARDWARE DEVICE POLLING USING DELAY ORDER

(71) Applicant: HEWLETT PACKARD ENTERPRISE DEVELOPMENT LP, Houston, TX (US)

(72) Inventor: Matthew S. Gates, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/449,195

(22) Filed: Sep. 28, 2021

(51) Int. Cl.
*G06F 3/06* (2006.01)

(52) U.S. Cl.
CPC .......... *G06F 3/0656* (2013.01); *G06F 3/0604* (2013.01); *G06F 3/067* (2013.01); *G06F 3/0635* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 5,596,576 A | 1/1997 | Milito | |
| 5,677,909 A | 10/1997 | Heide | |
| 6,151,312 A | 11/2000 | Evans et al. | |
| 6,282,187 B1 | 8/2001 | Evans et al. | |
| 6,697,870 B1 | 2/2004 | Cafarelli, III et al. | |

(Continued)

FOREIGN PATENT DOCUMENTS

CN 104320283 A * 1/2015

OTHER PUBLICATIONS

SNIAVideo, Transcript of video "10 Million I/Ops From a Single Thread (SDC 2019)," Oct. 31, 2019, video available at: <https://www.youtube.com/watch?v=4dgo3JRwiXw>.

(Continued)

*Primary Examiner* — Brian R Peugh
(74) *Attorney, Agent, or Firm* — Trop, Pruner & Hu, P.C.

(57) ABSTRACT

A process includes, responsive to a first epoch of a sequence of epochs, a plurality of processors accessing first entries of a first buffer that is shared among the plurality of processors. The first entries identify a first subset of hardware devices to be polled of a plurality of hardware devices. Responsive to the accessing, the plurality of processors poll the first subset of hardware devices. Responsive to the first epoch, the process includes, responsive to results of the polling, the plurality of processors updating delay orders that are associated with the first subset of hardware devices; and the plurality of processors adding second entries identifying the first subset of hardware devices to a plurality of second buffers based on the delay orders, where each second buffer of the plurality of second buffers corresponds to a different delay order of the delay orders. The process includes, responsive to a condition that represents an end of the first epoch, preparing the first buffer for a second epoch of the sequence of epochs. The preparation includes, responsive to a position of the second epoch in the sequence of epochs, selecting a second subset of hardware devices of the plurality of hardware devices for the second epoch. The selection includes selecting, from the plurality of second buffers, third entries that identify the second subset of hardware devices and adding the third entries to the first buffer.

20 Claims, 11 Drawing Sheets

(56) References Cited

U.S. PATENT DOCUMENTS

| | | | |
|---|---|---|---|
| 6,735,629 B1 | 5/2004 | Cafarelli, III et al. | |
| 6,877,081 B2 | 4/2005 | Herger et al. | |
| 7,412,513 B2 | 8/2008 | Levanoni et al. | |
| 7,571,216 B1 * | 8/2009 | McRae | G06F 13/28 |
| | | | 709/213 |
| 7,620,000 B2 | 11/2009 | Meier | |
| 8,417,828 B2 | 4/2013 | Ma et al. | |
| 8,738,860 B1 * | 5/2014 | Griffin | G06F 12/0897 |
| | | | 711/122 |
| 8,767,772 B2 | 7/2014 | Masputra et al. | |
| 9,705,733 B2 | 7/2017 | Zelek et al. | |
| 10,484,201 B2 | 11/2019 | Agrawal et al. | |
| 10,558,574 B2 | 2/2020 | Khade et al. | |
| 2012/0109852 A1 | 5/2012 | Lingam et al. | |
| 2012/0290805 A1 * | 11/2012 | Bish | G06F 12/0802 |
| | | | 711/E12.103 |
| 2013/0024875 A1 | 1/2013 | Wang et al. | |
| 2020/0218676 A1 | 7/2020 | Cao et al. | |
| 2020/0228451 A1 | 7/2020 | Luo | |
| 2020/0241927 A1 | 7/2020 | Yang et al. | |
| 2022/0066831 A1 | 3/2022 | Gates et al. | |

OTHER PUBLICATIONS

Walker et al., "10.39M Storage I/O Per Second From One Thread", available online at <https://spdk.io/news/2019/05/06/nvme/>, May 6, 2019, 15 pages.

* cited by examiner

REMAINDER OF EPOCH_ID /$2^N$ $2^N$ (FOR N=0,1,2,3 AND 4) — 508

| EPOCH_ID | 1 | 2 | 4 | 8 | 16 |
|---|---|---|---|---|---|
| 1 | 0 | 1 | 1 | 1 | 1 |
| 2 | 0 | 0 | 2 | 2 | 2 |
| 3 | 0 | 1 | 3 | 3 | 3 |
| 4 | 0 | 0 | 0 | 4 | 4 |
| 5 | 0 | 1 | 1 | 5 | 5 |
| 6 | 0 | 0 | 2 | 6 | 6 |
| 7 | 0 | 1 | 3 | 7 | 7 |
| 8 | 0 | 0 | 0 | 0 | 8 |
| 9 | 0 | 1 | 1 | 1 | 9 |
| 10 | 0 | 0 | 2 | 2 | 10 |
| 11 | 0 | 1 | 3 | 3 | 11 |
| 12 | 0 | 0 | 0 | 4 | 12 |
| 13 | 0 | 1 | 1 | 5 | 13 |
| 14 | 0 | 0 | 2 | 6 | 14 |
| 15 | 0 | 1 | 3 | 7 | 15 |
| 16 | 0 | 0 | 0 | 0 | 0 |
| 17 | 0 | 1 | 1 | 1 | 1 |
| 18 | 0 | 0 | 2 | 2 | 2 |

HARDWARE DEVICE POLLING USING DELAY ORDER

BACKGROUND

Storage applications on a computer platform may access hardware devices (e.g., storage devices, host bus adapters, storage nodes, and so forth) using tools and libraries of a user mode-based storage stack (e.g., a stack containing a Storage Performance Development Kit (SPDK) stack or another user mode-based storage stack). Unlike legacy storage stacks that rely on operating system kernel mode drivers, a user mode-based storage stack has user mode drivers, which avoids certain kernel mode overhead (e.g., context switching, system calls, locks, interrupt handling, and so forth). A consequence of a user mode-based storage stack is that instead of relying on interrupts from the hardware devices to indicate the availability of work, the hardware devices are interrogated, or polled, to determine whether or not the hardware devices have work. The work for a particular hardware device may be data that was requested via a prior read request, a pending direct memory access (DMA) transfer, a message to be communicated, an acknowledgement that data was stored in accordance with a prior write request, and so forth.

BRIEF DESCRIPTION OF THE DRAWINGS

FIG. 5 is a table of condition values illustrating the selection of next memory rings by a current memory ring preparation sub-process of FIG. 4 according to an example implementation.

DETAILED DESCRIPTION

Figure 1:
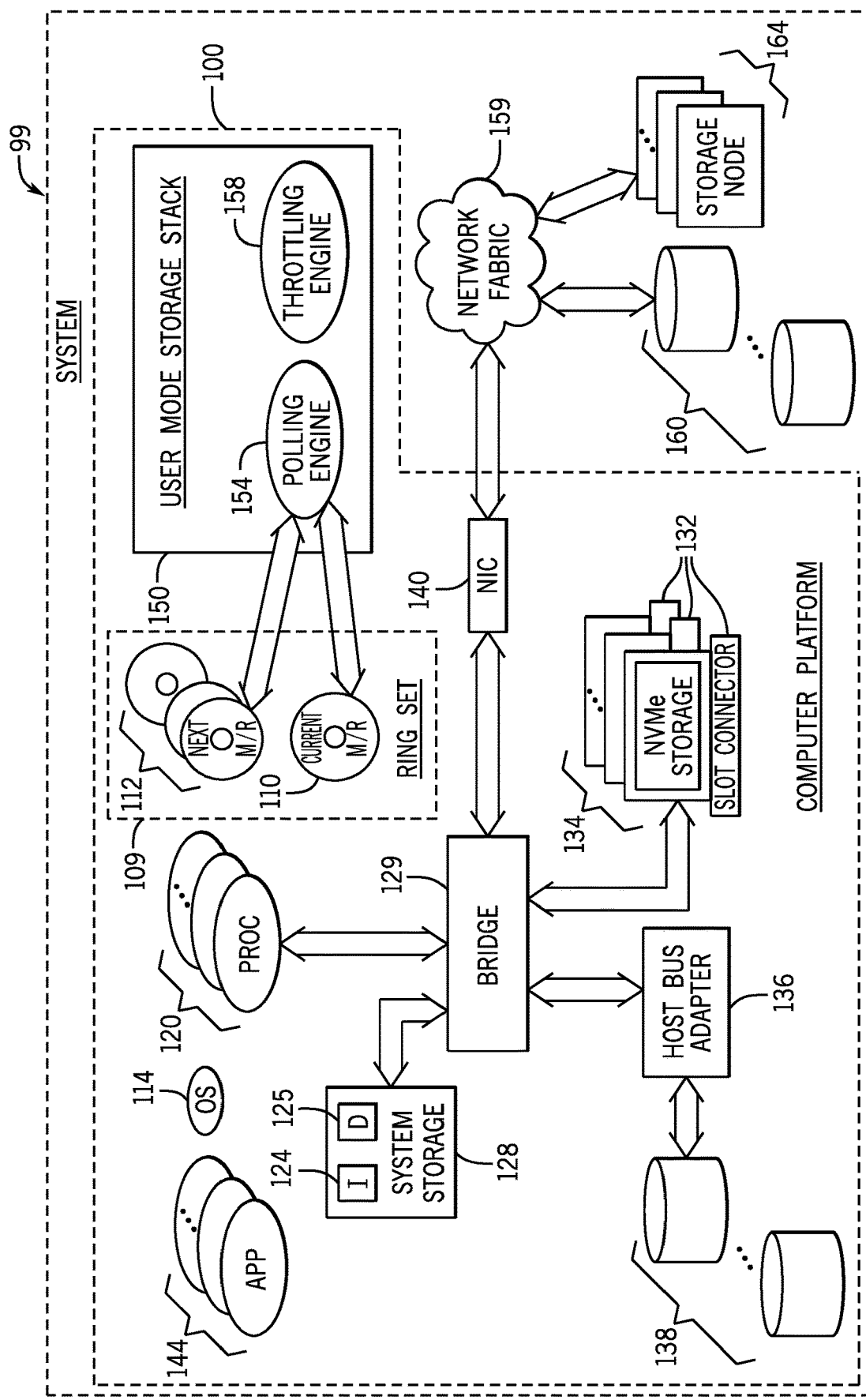
FIG. 1 is a schematic diagram of a computer system having a computer platform that polls hardware devices using a set of delay order-associated hardware device identification memory rings and throttles the polling based on a throttling percentage that is derived from processing core utilization measurements, according to an example implementation.

A user mode-based storage stack may have an associated polling load that has a strong correlation to the number of hardware devices that are being polled. In general, scaling up, or increasing, the number of hardware devices (e.g., adding more disk shelves, adding more host connections, and so forth) to the storage system increases the polling load. Because polling of hardware devices to determine work availability may consume more processing cycles than interrupt-based handling of work availability, efficiently scheduling polling may become more challenging as the number of hardware devices scales up. The overall goal of the polling scheduling is to efficiently find work among hardware devices of a storage system in a way that scales up without significantly adversely impacting storage performance metrics (e.g., input/output (I/O) throughput, completion latency time, and so forth).

In general, the hardware devices of a storage system may include backend and frontend hardware devices, such as, local storage devices, including, as examples, local storage devices (e.g., Non-Volatile Memory express (NVMe) storage disks, attached locally via Peripheral Component Interconnect express (PCIe) connectors); network-accessible storage devices (e.g., NVMe storage disks accessed over a network using an NVMe Over Fabric (NVMeOF) protocol); host bus adapters (e.g., Fibre Channel adapters, internet Small Computer Systems Interface (iSCSI) adapters, and so forth); storage nodes (e.g., storage nodes that perform direct memory access (DMA) transfers and/or messaging for a cluster); and so forth.

As used herein, "polling" a hardware device refers to a polling initiator (e.g., a hardware processing core) interrogating the hardware device (e.g., reading a designated memory location or register) to sample a state, or status, of the hardware device. In accordance with example implementations, polling a hardware device interrogates the hardware device to determine whether or not the hardware device has work to be performed by one or multiple processing cores. The hardware device "having work" refers to pending work being associated with the hardware device, which may be processed by processing cores of the computer system. More specifically, in accordance with example implementations, the polling of a particular hardware device may reveal that the hardware device has no work; the hardware device has data to be transferred (e.g., data resulting from a read request); the hardware device has an acknowledgement of the commitment of data to the storage (e.g., an acknowledgement responsive to a prior write request); the hardware device has requested to initiate a direct memory access (DMA) transfer; the hardware device has a message; and so forth.

One approach to scheduling polling involves hardware processing cores polling all of the hardware devices in a round-robin scheduling cycle. With this approach, each hardware device is polled once during the scheduling cycle and is not repolled until all hardware devices have been polled. However, such an approach to scheduling polling may not scale well with the number of hardware devices, as the time between poll instances of any given hardware device may increase with the number of hardware devices, thereby potentially resulting in higher I/O completion latencies. Moreover, the round-robin scheduling of polling may involve a considerable number of processing cycles polling hardware devices that have no current work to consume, which results in fewer processing cycles being available to process work from other hardware devices.

Another approach to scheduling polling divides the hardware devices into groups, such that each group is polled by a different set of hardware processing cores. For example, for a cluster of non-uniform memory architecture (NUMA) nodes, each NUMA node may maintain a list of hardware devices to poll, and the hardware processing cores of each NUMA node may select hardware devices from its list to poll. To enhance the ability of the system to scale up, each NUMA node may randomly or pseudo-randomly select hardware devices from its corresponding list. A challenge with this approach, however, may be that the random or pseudo-random selection of hardware devices to poll may not take into account that some hardware devices have work on a more regular basis than other storage devices. Accordingly, this approach may not efficiently find work.

Another approach to scheduling polling weights the above-described random or pseudo-random selection to bias the selection of hardware devices against hardware devices that consistently have less work. For example, hardware devices that had no work for the last few polling cycles may be weighted so that the random or pseudo-random selection is less likely to select these hardware devices. In this manner, as an example, a larger weight may correspond to a higher likelihood of selection, and vice versa. Therefore, the weighted likelihood for a given hardware device may, for example, keep decreasing with the total duration of time since the given hardware device last had work. However, challenges may arise with the random or pseudo-random polling scheduling approach, even with the weighting, because the likelihood of selecting an idle hardware device increases with the number of hardware devices, especially at low I/O intensities where many hardware devices may be idle at any given moment. Moreover, as the number of hardware devices increase, the random or pseudo-random selection has a lesser chance of selecting more important hardware devices to poll, such as a frontend host bus adapter or a hardware device that is used for DMA transfers between nodes.

In accordance with example implementations that are described herein, a set of hardware processing cores (e.g., a set of processing cores of a particular NUMA node) schedule polling by sharing a set of hardware device identification buffers. More specifically, the buffers store data, which represents hardware device identifications (IDs) of hardware devices to be polled by the processing cores. In accordance with example implementations, the set of buffers may be a set of memory rings, although a data structure other than a memory ring (to which the processing cores may share access) may be used for the buffer, such as a first-in-first-out (FIFO) buffer, in accordance with further implementations.

The set of memory rings, in accordance with example implementations, includes a "current" memory ring that has entries, or slots, that store data representing IDs of hardware devices, which are scheduled to be polled within a current unit of time called a current "epoch" herein. During a current epoch, the hardware processing cores execute batches of jobs and also performing polling cycles that are directed to the hardware devices whose IDs are stored in the current memory ring.

A hardware processing core polls a hardware device in a process called a "polling cycle" herein. To perform the polling cycle, the hardware processing core accesses a slot of the current memory ring (which is pointed to by a consumer index, or pointer, of the current memory ring); removes, or dequeues, the hardware device ID (i.e., reads the data from the access slot, which represents the hardware device ID); and polls the hardware device corresponding to the retrieved hardware device ID.

In accordance with example implementations, the current epoch begins when the current memory ring is full, i.e., at the beginning of the current epoch, each slot, or entry, of the current memory ring stores data representing a different hardware device ID to be polled in the current epoch. Eventually, after the processing cores dequeue all of the hardware device IDs from the current memory ring, the memory ring is empty, and the current epoch ends. A hardware processing core then prepares the current memory ring for the next epoch by adding, or enqueueing, data onto the current memory ring representing the hardware device IDs of hardware devices to be polled in the next epoch.

In addition to the current memory ring, the scheduling of polling involves the use of multiple "next" memory rings. As described herein, in accordance with example implementations, to prepare the current memory ring for the next epoch (responsive to the current memory ring being empty), a hardware processing core selects a set (e.g., one, two, all, and so forth) of the next memory rings according to a selection criterion (described herein); dequeues hardware device IDs from the selected set of next memory rings; and enqueues these hardware device IDs onto the current memory ring.

More specifically, in accordance with example implementations, the next memory rings are ordered and have entries, or slots, which store data representing hardware device IDs. Due to the ordering, the hardware device IDs that are stored in a particular next memory ring have the same order as this next memory ring. In accordance with example implementations, the "order," called a "delay order" herein, corresponds to how often (in terms of epochs) the hardware device IDs having the delay order are polled (i.e., how often the hardware device IDs are enqueued onto the current memory ring).

For example, in accordance with some implementations, the next memory rings may include five memory rings that are each associated with a different delay order of 0, 1, 2, 3 or 4; and the hardware device IDs that are stored in one of these next memory rings have the same delay order as the next memory ring and are polled every $2^{DELAY\ ORDER}$ (i.e., 2 to the power of the delay order value) epochs. Therefore, hardware devices having hardware device IDs that are stored in a next memory ring that is associated with the delay order of "0" are polled every epoch (i.e., every 1 ($2^0$) epoch); hardware devices that are stored in a next memory ring that is associated with a delay order of "1" are polled every other epoch (i.e., every 2 ($2^1$) epochs); hardware devices having hardware device IDs that are stored in a next memory ring that is associated with a delay order of "2" are polled every fourth epoch (i.e., every 4 ($2^2$) epochs); and so forth.

After a hardware processing core dequeues a hardware device ID from the current memory ring and polls the corresponding hardware device, the hardware processing core, in accordance with example implementations, selects a next memory ring for storing the hardware device ID based on the most recent polling results for the hardware device. More specifically, in accordance with example implementations, after a hardware processing core polls a hardware device, the hardware processing core determines a delay order for the hardware device (which may or may not be the same as the previous delay order for the hardware device ID), based on the result of the polling (i.e., whether or not the hardware device has work to be processed), as described below. The hardware processing core then stores data representing the hardware device ID in the next memory ring that is associated with the determined delay order, thereby controlling the future frequency (in terms of epochs) at which the hardware device is polled. In accordance with example implementations, the hardware processing core determines the delay orders for the hardware devices based on whether or not work was found for the hardware devices; and accordingly, the polling scheduling causes hardware devices that consistently have work to be polled more frequently and hardware devices that consistently have no work to be polled less frequently.

In accordance with example implementations, the number of entries of the current memory ring is variable, as the number of entries vary from one epoch to the next, depending on the number of hardware device IDs that are polled in each epoch. Moreover, due to the variations in the number of entries of the current memory ring from one epoch to the next, the time durations of the individual epochs also vary. Due to the self-tuning natures of the memory ring sizes and current epoch duration, the polling scheduling that is described herein scales well with the number of hardware devices of the storage system.

Referring to FIG. 1, as a more specific example, in accordance with some implementations, a computer system 99 may include one or multiple computer platforms 100. As an example, in accordance with some implementations, the computer system 99 may be a cluster of computer platforms 100, where each computer platform 100 includes hardware and software to provide a set of compute nodes for the cluster. A storage array is an example of the computer platform 100, in accordance with an example implementation. The computer platform 100 may, however, be a platform other than a storage array, in accordance with further implementations, such as a rack-mounted server or other rack-mounted appliance, a client, a desktop, a smartphone, a laptop computer, a tablet computer, and so forth. Moreover, the computer system 99 may not be a cluster-based system, in accordance with further implementations.

For example implementations in which the computer platform 100 is a storage array, the storage array may have a frame, or chassis; one or multiple motherboards may be mounted to the chassis; and each motherboard may contain one or multiple controllers comprising single or multicore central processing unit (CPU) semiconductor packages (or "sockets" or "chips"). In some examples, the storage array may have a form factor, a mechanical latch(es) and corresponding electrical connectors for purposes of allowing the storage array to be installed in and removed from a slot, in a rack-mounted blade enclosure.

Regardless of its particular form, the computer platform 100 includes hardware processors, or hardware processing cores 120 (e.g., central processing unit (CPU) cores, graphics processing unit (GPU) cores, and so forth). In addition to the processing cores 120, the computer platform 100 may include other hardware, such as, for example, a system storage 128, a bus infrastructure; one or multiple network interface controllers (NICs) 140; I/O devices, and so forth.

In accordance with example implementations, the processing cores 120 may execute machine-executable instructions 124 (or "software"), stored on at least one machine-readable storage medium, for the computer platform 100. For example, the processing cores 120 may execute instructions 124 that are associated with one or multiple applications 144 (e.g., storage applications and possibly other applications), and instructions 124 associated with a user mode-based storage stack 150.

In this context, a "user mode-based storage stack" generally refers to a storage layer, or interface, which provides a user mode storage solution (e.g., user mode libraries, tools, drivers, and so forth) for one or multiple applications 144 for purposes of allowing the applications 144 to access hardware devices of a storage system. Here, "user mode" refers to the user mode of an operating system 114, as opposed to a kernel mode of the operating system 114. In general, due to the use of the user mode-based storage stack, the processing cores 120 poll the hardware devices of the storage system for purposes of determining whether or not the hardware devices have work to be performed by the processing cores 120.

As described further herein, for purposes of polling hardware devices of the storage system, the processing cores 120 may be divided into groups, with each group of processing cores 120 using an associated memory ring set 109 (one example memory ring set 109 being depicted in FIG. 1) to schedule the polling of an associated set of hardware device of the storage system. In accordance with example implementations, the memory ring set 109 includes a current memory ring 110 and multiple next memory rings 112.

In accordance with some implementations, the computer platform 100 may contain multiple NUMA nodes, and each NUMA node may contain multiple processing cores 120. Each NUMA node may contain multiple groups of processing cores 120, and each group of processing cores 120, within a NUMA node, may use an associated memory ring set 109 to control the polling of a corresponding set of hardware devices of the storage system. In accordance with example implementations, a NUMA node corresponds to a single operating system instance.

In accordance with example implementations, the processing cores 120 may execute instructions 124 to perform batches of jobs for the applications 144 and to perform polling cycles to poll hardware devices. For purposes of performing a given polling cycle, a given processing core 120 executes instructions 124 to form a polling engine 154, and the polling engine 154 performs a process to interact with the memory ring set 109, such as example process 400 that is described below in connection with FIG. 4. Although FIG. 1 depicts a single polling engine 154, at any particular time, the computer platform 100 may have multiple active polling engines 154 that are associated with multiple processing cores 120.

In accordance with example implementations, the system storage 128 and other storage that is discussed herein each comprise at least one non-transitory machine-readable storage medium that may be formed, in general, from storage device(s), such as semiconductor storage device(s), magnetic storage device(s), phase change memory device(s), a combination of devices of one or more of these storage technologies, or the like. The system storage 128 may represent a collection of both volatile memory devices and non-volatile memory devices. In addition to the instructions 124, the system storage 128 stores data 125, which represents data associated with different data categories, or types, such as preliminary, intermediate and final result data associated with the execution of the instructions 124; data structures, such as one or multiple memory ring sets 109; and so forth.

In accordance with example implementations, a given processing core 120 may, in general, interleave job cycles with polling cycles. In a particular job cycle, the processing core 120 may execute a batch (e.g., eight) of jobs for an application 144, where a "job" refers to a unit of work that is performed by the processing core 120. After performing a batch of jobs in the corresponding job cycle, the processing core 120 may then determine whether to execute a polling cycle before returning to executing another batch of jobs in another job cycle.

The processing core 120 may, in accordance with example implementations, determine whether or not to bypass a particular polling cycle based on a polling cycle throttling percentage (herein called a "throttling percentage"). In this context, a "throttling percentage" refers to a percentage, or share, of polling cycles for the processing core 120 to skip, or bypass. Therefore, for example, a throttling percentage of 90 percent means that the processing core 120 bypasses otherwise scheduled polling cycles 90 percent of the time, whereas a throttling percentage of 20 percent means that the processing core 120 bypasses otherwise scheduled polling cycles 20 percent of the time.

A given processing core 120 may, in accordance with example implementations, execute instructions 124 as an instance of a throttling engine 158 that performs a process to determine, based on a measured total utilization of the given processing core 120 and a measured polling utilization of the given processing core 120, a percentage, or share, of polling cycles for the given processing core 120 to skip, or bypass, such as example process 700 that is described below in connection with FIGS. 7A and 7B. Although FIG. 1 depicts a single throttling engine 158, at any particular time, the computer platform 100 may have multiple active throttling engines 158 that are associated with multiple processing cores 120.

The "storage system" referred to herein includes hardware devices that are accessible through the storage stack 150 and perform operations related to the storing and retrieval of data. The hardware devices may include mass storage devices, as well as other devices related to the retrieval and storage of data in the mass storage devices. The "hardware devices" refer to components of the storage system that are capable of being polled and in response to being polled, provide an indication (e.g., data stored in a memory or register of the hardware device) of whether or not the hardware device has work. The hardware device may be a component of the computer platform 100 or may be a component that is external to the computer platform 100.

As an example, the hardware devices may include one or multiple NVMe storage devices 134 that may be installed in slot connectors 132 (e.g., PCIe connectors) of the computer platform 100. As another example, the hardware devices may include storage devices 160 (e.g., NVMe storage devices) that are accessed over network fabric 159 using, for example, an NVMeOF protocol. As another example, the hardware devices may include a host bus adapter 136 of the computer platform 100, which controls communication with storage devices 138 (e.g., SCSI devices, Fibre Channel devices, and so froth). As another example, the hardware devices may include network-accessible (via the network fabric 159) storage nodes 164.

The processing cores 120 may access the storage drives 160 and storage nodes 164, as well as other hardware devices, by communicating with the network fabric 159 via one or multiple NICs 140. In general, the network fabric 159 may be associated with one or multiple types of private and/or public communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the bus infrastructure of the computer platform 100 may include one or multiple bridges 129 that may be coupled to the system storage 128; one or multiple expansion buses (e.g., PCIe buses); and so forth. In general, the bridge(s) 129 may include interfaces to various buses of the computer platform 100, such as a PCIe bus, a Serial Peripheral Interconnect (SPI) bus, an enhanced SPI (eSPI) bus, a Low Pin Count (LPC) bus, an Inter-Integrated ($I^2C$) bus, an Improved Inter-Integrated ($I^3C$) bus, as well as possibly one or multiple buses associated with other bus standards.

In accordance with some implementations, the bridge(s) 129 may include a north bridge 129 and a separate south bridge 129. In this manner, in accordance with some implementations, the processing core 120 may include one or multiple semiconductor packages (or "chips"), and the processing core 120 may include the north bridge 129 that includes a memory controller and PCIe root ports. The south bridge 129 that may provide I/O ports, such as, for example, Serial Advanced Technology Attachment (SATA) ports, Universal Serial Bus (USB) ports, LPC ports, SPI ports, eSPI ports and so forth. In accordance with some implementations, the north bridge 129 may not be part of the processing core 120. In accordance with further implementations, the north and south bridges may be combined into a single bridge 129; and in accordance with some implementations, this single bridge 129 may be part of a multi-core central processing unit (CPU) semiconductor package (or "chip"), which contains multiple processing cores 120.

A group of processing cores 120 (e.g., a subset of a larger set of processing cores 120 of a particular NUMA node) may use the memory ring set 109 to schedule the polling of a set of hardware devices of the storage system. The processing cores 120 of the group may exclude from the polling any hardware devices that are known by the processing cores 120 to be idle. In such examples, a processing core 120 may determine that a particular hardware device is idle based on the absence of scheduled work (e.g., no pending reads or writes) for the hardware device.

The processing cores 120 may, however, be unable to determine whether some hardware devices are idle, as some hardware devices may initiate work without being requested to do so by the processing cores 120. For example, a storage node 164 may initiate the transfer of data or initiate the sending of a message, and therefore, the processing cores 120 may be unable to assess at any particular time whether or not the storage node 164 is idle. Therefore, in accordance with some implementations, the processing cores 120 consider some hardware devices to always be active. This assessment may, for example, be based on the particular type, or category, of the hardware device. In accordance with example implementations, the hardware devices that have their corresponding hardware device IDs stored in the memory ring set 109 are active devices. In this context, in accordance with example implementations, a hardware device "ID" for a given hardware device refers to an identifier (e.g., a numeric sequence, alphanumeric sequence, and so forth) that may be used to sufficiently identify, or distinguish, the given hardware device from any of the other hardware devices of the storage system.

In accordance with example implementations, the processing cores 120 assign values called "delay orders" to the hardware devices. In general, a "delay order" refers to a value that represents how often an associated hardware device is to be polled and generally corresponds to the relative level of activity of the hardware device (from a work perspective), as compared to other hardware devices. In accordance with example implementations, the delay order is an integer within a range of integer delay orders. The smallest integer value of the range corresponds to a hardware device that is deemed to have work more often (and therefore is polled relatively more often), and the highest integer value of the range corresponds to a hardware device that is deemed to provide less often (and therefore is polled relatively less often).

As an example, in accordance with some implementations, five delay orders are used: 0, 1, 2, 3 and 4. A lower delay order corresponds to a higher polling frequency, and vice versa. Therefore, the delay order of "0" corresponds to the highest polling frequency, and the delay order of "4" corresponds to the lowest polling frequency. In accordance with example implementations, a hardware device's delay order increases after several successive polling attempts have been made to the device, with all of these polling attempts revealing that the hardware device does not have any work pending. Conversely, in accordance with example implementations, a hardware device's delay order decreases in response to a polling device revealing that the hardware device has work pending.

In accordance with example implementations, the shared memory rings 110 and 112 are data structures that allow for lock-free enqueuing and dequeuing of one or multiple data corresponding to hardware device IDs to/from the data structures by multiple processing cores 120. In accordance with example implementations, the polling by the processing cores 120 (which are associated with a particular memory ring set 109) occurs in variable units of scheduling time called "epochs." In general, an "epoch" refers to a time duration in which the processing cores 120 poll hardware devices that have their associated hardware device IDs stored in the current memory ring 110. During a given epoch, the processing cores 120 dequeue hardware device IDs from the current memory ring 110 and poll the corresponding hardware devices until all entries of the current memory ring 110 have been removed, or dequeued (at which time the epoch ends). As described further herein, when all entries of the current memory ring 110 have been dequeued (i.e., when the current memory ring 110 is empty and the current epoch has ended), hardware device IDs from one or multiple next memory rings 112 are added to, or enqueued, onto the current memory ring 110 for the next epoch.

Figure 2:
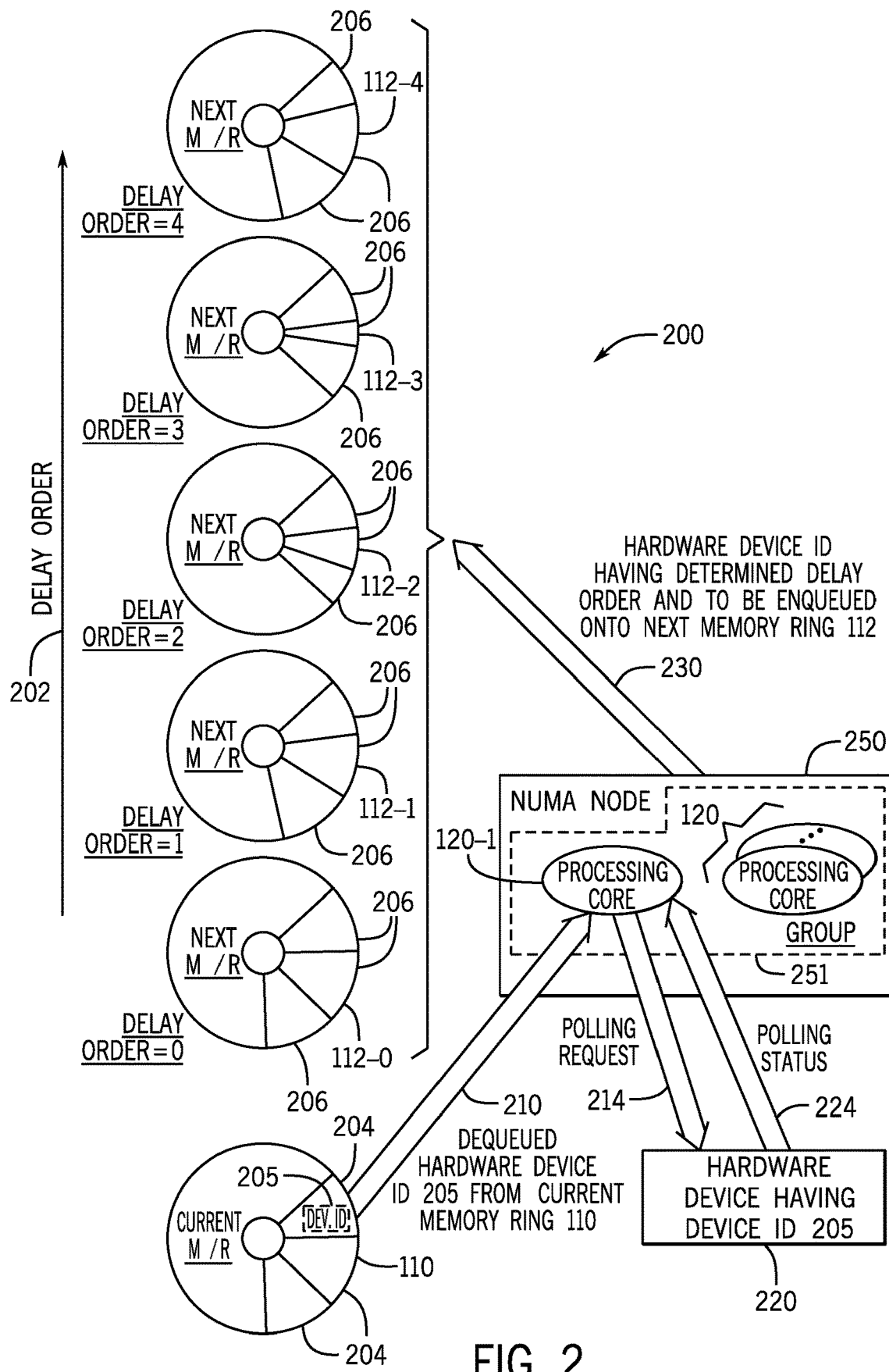
FIG. 2 is an illustration of a processing core using an associated memory ring set to poll a hardware device according to an example implementation.

FIG. 2 is an illustration 200 of the use of the current memory ring 110 and the next memory rings 112 by a particular processing core 120-1 in association with a particular polling cycle. Referring to FIG. 2 in conjunction with FIG. 1, the processing core 120-1 may be one of a group 251 of processing cores 120, such as, for example, a subset of processing cores 120 of a particular NUMA node 250. The current memory ring 110 has entries 204, where each entry 204 stores data representing a particular hardware device ID, such as example hardware device ID 205 that corresponds to depicted hardware storage device 220. As depicted in the illustration 200, the processing core 120-1 dequeues (as depicted at reference numeral 210) the hardware device ID 205 from the current memory ring 110. In this context, "dequeuing," or "removing," a hardware device ID from a memory ring refers to the retrieval of data representing the hardware device ID from a particular entry, or slot, of the memory ring and performing any associated update to the memory ring (e.g., advancing a pointer, etc.).

The processing core 120-1 submits a polling request 214 to the hardware device 220 having the retrieved hardware device ID 205, and the polling request 214 returns a polling status 224. For example, the processing core 120-1 may read data from a particular memory address or register address of the hardware device, and this read data may indicate the polling status 224, i.e., whether or not the hardware device 220 has work to be processed. Based on the polling status 224 and past history for the hardware device 220, the processing core 120-1 may then, in accordance with example implementations, adjust a delay order value associated with the hardware device 220. For example, after a certain number of consecutive responses from the hardware device 220 indicating that there is no work pending, the processing core 120-1 may increase the delay order associated with the hardware device 220; and if the hardware device 220 has work pending, then the processing core 120-1 may, for example, adjust the delay order associated with the hardware device 220 to the lowest value (e.g., a delay order value of "0"). It is noted that, in accordance with example implementations, the polling result for a particular polling cycle may not change the delay order associated with the hardware device 220.

After determining the delay order for the hardware device 220, the processing core 120-1 enqueues (as depicted at reference numeral 230) the hardware device ID 205 for hardware device 220 onto the next memory ring 112 associated with the determined delay order among the plurality of next memory rings 112. In this context, "enqueueing," or "adding," the hardware device ID onto a memory ring refers to adding data representing the hardware device ID to a corresponding entry, or slot, of the memory ring and performing any associated update to the memory ring (e.g., advancing a pointer, etc.).

As depicted at reference numeral 202, each of the next memory rings 112 may have different associated delay order values. For example, the next memory ring 112-0 may have the lowest delay order value, the next memory ring 112-1 may have the next lowest delay order value, and so forth. As a more specific example, the next memory rings 112-0, 112-1, 112-2, 112-3 and 112-4 may have the delay orders of 0, 1, 2, 3, and 4, respectively. Moreover, the hardware devices that have hardware device IDs that are stored in a particular next memory ring 112 are polled every $2^{DELAY\ ORDER}$ epoch(s) (i.e., a number of epochs equal to 2 to the power of the delay order value), where "DELAY ORDER" represents the delay order associated with the next memory ring 112. Therefore, hardware devices that have their hardware device IDs stored in the lowest delay order associated next memory ring 112-0 are scheduled to be polled in every epoch (2^0); hardware devices having hardware device IDs stored in the next lowest delay order associated next memory ring 112-1 are scheduled to be polled every other epoch (2^1); hardware devices having hardware device IDs stored in the next memory ring 112-2 are scheduled to be polled every fourth epoch (2^2); and so forth.

Figure 3:
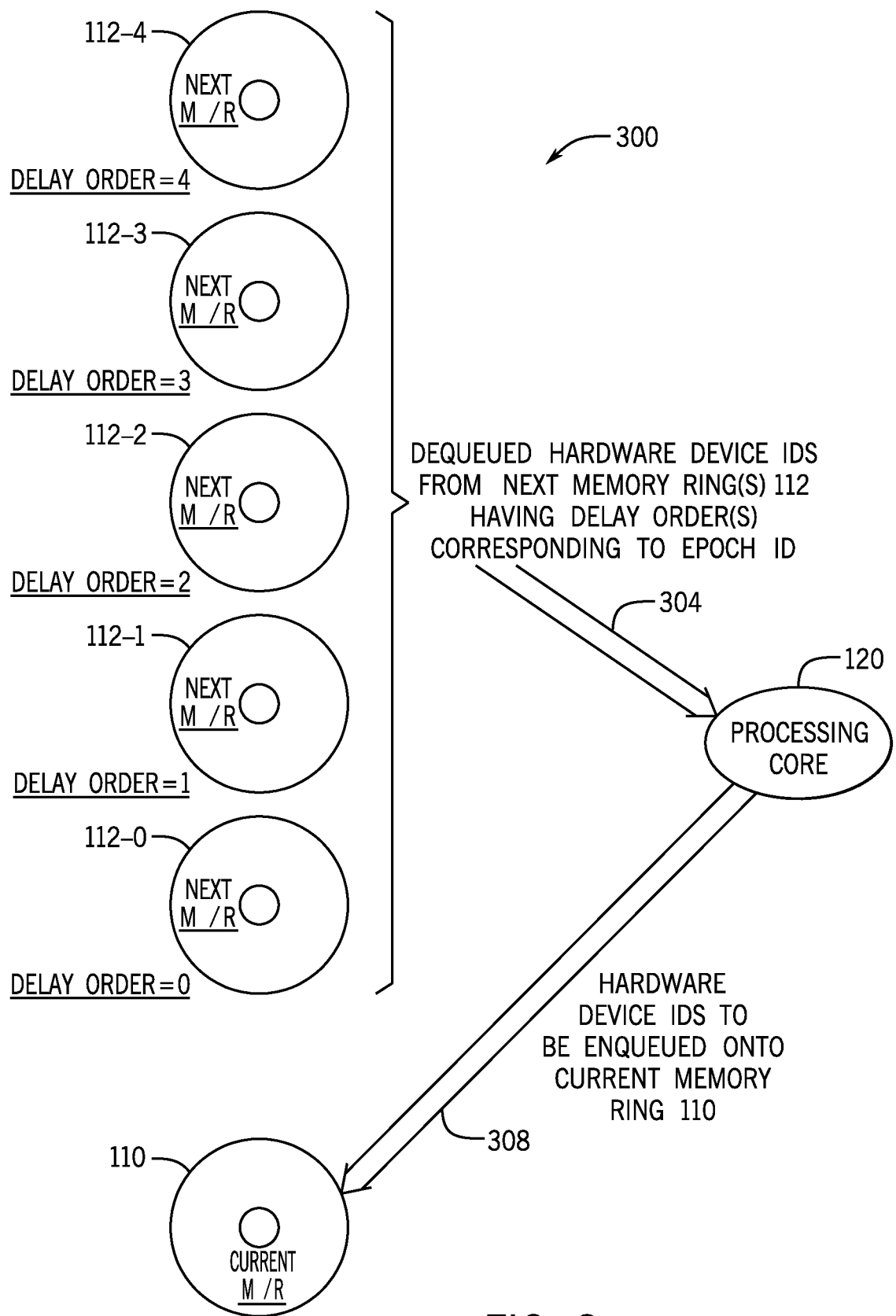
FIG. 3 is an illustration of a processing core preparing a current memory ring of the memory ring set for an upcoming epoch according to an example implementation.

FIG. 3 depicts a process 300 to prepare the current memory ring 110 for the next epoch, in accordance with example implementations. In accordance with example implementations, the process 300 is performed in response to one of the processing cores 120 (associated with the memory ring set 109) detecting a condition that corresponds to the end of the current epoch. In accordance with example implementations, the condition is the current memory ring 110 being empty, i.e., all hardware device IDs have been dequeued from the current memory ring 110. When this condition is detected by a processing core 120, the processing core 120 attempts to obtain a lock on the set of memory rings 109 (to prevent any other processing cores 120 from accessing the current memory ring 110 and next memory rings 112); and responsive to the given processing core 120 obtaining the lock, the processing core 120 proceeds with preparing the current memory ring 110 for the next epoch as follows.

Referring to FIG. 3 in conjunction with FIG. 1, as part of the preparation of the current memory ring 110 for the next epoch, the processing core 120 selects one or multiple delay orders (as further described herein) and dequeues, or removes, hardware device IDs from the next memory ring(s) 112 having the corresponding selected delay order(s), as depicted at reference numeral 304. In accordance with example implementations, the selection of the delay order(s) is controlled by an identifier, or epoch index (called "EPOCH ID" in FIG. 3). More specifically, in accordance with example implementations, the epochs are associated with a cyclical sequence of epochs; and the processing core 120 selects the next memory rings 112 based on an epoch index that indicates a particular position in the cyclical sequence.

For example, in accordance with some implementations, the delay orders are 0, 1, 2, 3 and 4; and the epochs are ordered in a repeating, or cyclic, sequence of sixteen epochs, i.e., a sequence of $2^{HIGHEST\ DELAY\ ORDER}$ (i.e., 2 to the power of the highest delay order value), or $2^4$ epochs. Therefore, for this set of delay orders, hardware devices that are associated with the delay order of "0" are polled in all sixteen epochs of the sequence. Hardware devices that are associated with the delay order of "1" are polled every other epoch of the sequence. Hardware devices that are associated with the delay order of "2" are polled every fourth epoch of the sequence of epochs. Hardware devices that are associated with the delay order of "3" are polled twice during the sequence, i.e., every eighth epoch. Hardware devices that are associated with the delay order of "4" are polled once every sequence of epochs.

In accordance with example implementations, the epoch index monotonically increases over time. For example, in accordance with some implementations, the epoch index may be an integer, and the integer may be incremented by one when the current epoch (indexed by a particular integer) transitions to the next epoch (indexed by the particular integer+1). As an example, for delay order values of 0, 1, 2, 3 and 4 (i.e., sixteen epochs per sequence), epoch indices 1, 17, 33, 65, 97 refer to the same epoch of the sequence of epochs; epoch indices 2, 18, 34, 66, 98 refer to the same epoch of the sequence of epochs; and so forth.

Still referring to FIG. 3, in accordance with example implementations, as part of the preparation of the current memory ring 110 for the next epoch, the processing core 120 may apply a mathematical operation, or function, to the epoch index corresponding to the next epoch to identify the delay orders that are associated with the next epoch; and based on the identified delay orders, the processor core 120 selects the corresponding next memory rings 112 from which the hardware device IDs are dequeued and then enqueued onto the current memory ring 110 to prepare the current memory ring 110 for the next epoch.

More specifically, in accordance with example implementations, a delay order N is associated with a particular epoch index if the following condition is satisfied:

$$\text{EPOCH\_ID MOD } 2^N = 0, \quad \text{Condition 1}$$

where "MOD" represents a modulo operator, which returns the remainder of the integer division of EPOCH_ID (i.e., the epoch index) divided by $2^N$ (2 to the power N). In other words, in accordance with example implementations, if an epoch index is evenly divisible by $2^N$, then the hardware devices that have IDs that are associated with the delay order N are polled in the epoch corresponding to the epoch index. It is noted that more than one delay order (i.e., more than one value for N) may satisfy Condition 1 for a particular epoch index.

The processing core 120 may, in accordance with example implementations, as part of the preparation of the current memory ring 110 for the next epoch, evaluate Condition 1 for multiple candidate delay orders to identify delays orders that are associated with the next epoch. Based on these evaluations, the processing core 120 may then dequeue the hardware device IDs from the next memory rings 112 that are associated with the identified delay orders (as depicted at reference numeral 304) and enqueue these hardware device IDs (as depicted at reference numeral 308) onto the current memory ring 110.

Figure 4:
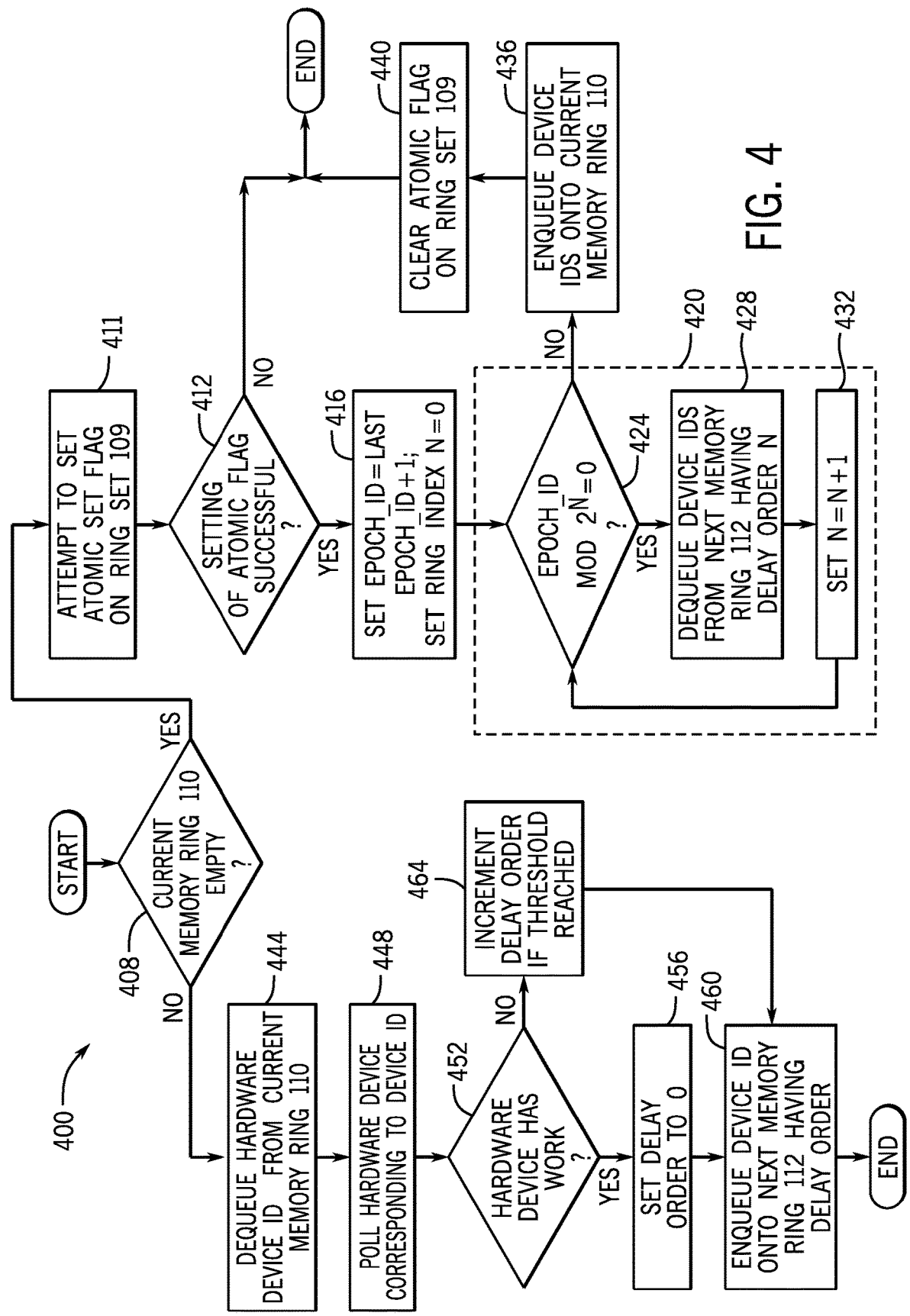
FIG. 4 is a flow diagram depicting a polling process of a processing core that uses a current memory ring and delay order-associated next memory rings according to an example implementation.

FIG. 4 depicts an example process 400 of the polling engine 154 (FIG. 1) in accordance with example implementations. In general, a processing core 120 may execute the process 400 to form an instance of the polling engine 154 and perform a polling cycle. Referring to FIG. 4 in conjunction with FIGS. 1 and 2, in accordance with example implementations, pursuant to decision block 408 of the process 400, the processing core 120 determines whether the current memory ring 110 is empty. If the current memory ring 110 is not empty, then the processing core 120 dequeues (block 444) a hardware device ID from the current memory ring 110 and polls the hardware device that corresponds to the hardware device ID, pursuant to block 448. The processing core 120 determines (decision block 452), as a result of the polling, whether the hardware device has work pending. If the hardware device has work pending, the processing core 120 sets (block 456) the associated delay order for the hardware device to zero and adds (block 460), or enqueues, the hardware device ID of the hardware device to the next memory ring 112-0; and at this point, the process 400 (and polling cycle) ends.

If the processing core 120 determines (decision block 452) that, as a result of the polling, that the hardware device does not have work pending, then, pursuant to block 464, the processor 464 increments the current delay order for the hardware device by one, in response to a consecutive number of "no work" responses from the hardware device reaching a no work threshold. In this manner, in accordance with some implementations, the processing cores 120 that share the memory ring set 109 may maintain and share a count of successive "no work" responses from hardware devices, such that if a particular hardware device has no work pending for a certain number of consecutive pollings, then the delay order of that hardware device is increased, resulting in a future lower frequency of pollings for the hardware device. In accordance with example implementations, a processing core 120, in response to determining that a particular hardware device has work pending, may clear, or reset, a count of successive "no work" responses for the device.

If the processing core 120 determines (decision block 408) that the current memory ring 110 is empty, then the processing core 120 attempts to set an atomic flag for the current memory ring 110. A set atomic flag serves as a lock to allow the processing core 120 acquiring the lock to prepare the ring set 109 for the next epoch. This preparation involves the processing core 120 dequeuing hardware device IDs from the next memory rings 109 of the ring set and enqueuing these hardware device IDs onto the current memory ring 110 of the ring set 109. Consequently, the lock prevents other processing cores 120 that share the ring set 109 from accessing the ring set 109 while the ring set 109 is being prepared for the next epoch.

If the processing core 120 determines (decision block 412) that the setting of the atomic flag is unsuccessful, then the process 400 terminates, as there are no more hardware devices to poll, and another processing core 120 is preparing the ring set 109 for the next epoch. If, however, the processing core 120 determines (decision block 412) that the setting of the atomic flag is successful, then this means the processing core 120 can proceed with preparing the ring set 109 for the next epoch. In this preparation, the processing core 120, pursuant to block 416, first increments the epoch index (called "EPOCH_ID" in FIG. 4) by one so that the epoch index references the next epoch; and the processing core 120 initializes a parameter called "ring index N" to have a value of zero. Next, the processing core 120 begins a subprocess 420 to identify and dequeue hardware device IDs from the appropriate next memory ring(s) 112, so that these hardware device IDs may then be enqueued (pursuant to block 436, after the subprocess 420 ends) onto the current memory ring 110.

The ring index N corresponds to a candidate delay order, and the subprocess 420 involves the processing core 120 evaluating Condition 1 for candidate delay orders for purposes of determining whether the candidate delay orders are associated the updated epoch index. More specifically, the processing core 120 evaluates (decision block 424) whether Condition 1 is satisfied for the current value of the ring index N. If Condition 1 is satisfied, then the processing core 120 dequeues, or removes, all of the hardware device IDs from the next memory ring 112 that corresponds to the current value of the ring index N; increments (block 432) the value of the ring index N by one; and returns to decision block 424.

In accordance with example implementations, Condition 1 is satisfied for a set of one or more initial successive values of the ring index N; and when the condition is not satisfied for a particular value of the ring index N, then Condition 1 will not be satisfied for any of the remaining value(s) of the ring index N. Stated differently, in accordance with example implementations, the subprocess 420 ends (and no more hardware devices IDs are dequeued from the next memory rings 112) in response to Condition 1 not being satisfied. This aspect of the subprocess 420 is illustrated in a table 500 of FIG. 5, which depicts the remainders of $EPOCH\_ID/2^N$ for example consecutive epoch indices of 1, 2, 3 . . . 18, which correspond to rows 504 of the table 500. Columns 508 of the table 500 correspond to $2^N$ values of 1, 2, 4 and 16 for corresponding N values of 0, 1, 2, 3 and 4, respectively. The rows 504 that have the same number of zero(es) correspond to the same epoch of the sequence of epochs.

More specifically, as depicted in the first row 504 that corresponds to an epoch index of "1," the first entry (corresponding to N=0) is zero, and the other entries of the first row 504 are nonzero entries. This means that for the epoch index of "1," the hardware device IDs from the next memory ring 112-0 are dequeued, and then the subprocess 420 ends. In a similar manner, the subprocess 420 ends after identifying and dequeuing hardware device IDs from the next memory ring 112-0 for the other example odd epoch indices of 3, 5, 7, and so forth.

The second row 504 of the table 500 corresponds to an epoch index of "2," and the first two entries (corresponding to N=0 and N=1) of the second row 504 are zero, which means that the hardware device IDs from the next memory rings 112-0 and 112-1 are dequeued before the subprocess 420 ends. As depicted in the fourth row of table 500, which corresponds to an epoch index of "4," the first three entries (corresponding to N=0, N=1 and N=2) are zero, which means the hardware device IDs from the next memory rings 112-0, 112-1 and 112-2 are dequeued before the subprocess 420 ends. In a similar manner, due to the cyclic nature of the epochs, hardware device IDs from the next memory rings 112-0, 112-1 and 112-2 are dequeued every fourth epoch, i.e., epochs corresponding to the epoch indices of "8," "12," "16," and so forth.

The eighth row 504 of the table 500 corresponds to an epoch index of "8," and the first four entries (corresponding to N=0, N=1, N=2 and N=3) of the eighth row 504 are zero, which means the hardware device IDs from the next memory rings 112-0, 112-1, 112-2 and 112-3 are dequeued before the subprocess 420 ends. Correspondingly, due to the cyclic nature of the epochs, hardware device IDs from the next memory rings 112-0, 112-1, 112-2 and 112-3 are dequeued every eighth epoch, i.e., epoch indices of "16," "24," "32," and so forth.

As depicted in the sixteenth row 504 that corresponds to an epoch index of "16," the first five entries (corresponding to N=0, N=1, N=2, N=3 and N=4) are zero, which means the hardware device IDs from the next memory rings 112-0, 112-1, 112-2, 112-3 and 112-4 are dequeued before the subprocess 420 ends. In a similar manner, due to the cyclic nature of the epochs, hardware device IDs from the next memory rings 112-0, 112-1, 112-2, 112-3 and 112-4 are dequeued for every sixteenth epoch, i.e., epochs corresponding to epoch indices of "32," "48," "64," and so forth.

Still referring to FIG. 4, after the subprocess 420 has ended and the processing core 120 has dequeued a set of hardware device IDs from the next memory ring(s) 112, as depicted in block 436, the processing core 120 enqueues the dequeued hardware device IDs onto the current memory ring 110. At this point, the current memory ring 110 is prepared for the epoch corresponding to the EPOCH_ID index (i.e., the next epoch), and the processing core 120 clears (block 440) the atomic flag for the ring set 109 before the process 400 terminates.

In accordance with example implementations, one or more processing cores 120 may execute instructions, stored on at least one machine-readable storage medium, to perform polling cycles as described above in relation to FIGS. 1-5 and below in relation to FIGS. 8-10. In accordance with example implementations, processing cores 120 may execute instructions, stored on at least one machine-readable storage medium, to perform scheduled jobs for the applications 144 (see FIG. 1). In some examples, processing core(s) 120 may execute instructions, stored on at least one machine-readable storage medium, to balance processing time between polling and job execution using a throttling percentage, as described below in relation to FIGS. 6-7B, for example. In this context, a "throttling percentage" refers to a percentage, or share, of polling cycles that are skipped, or bypassed, by a processing core 120.

Figure 6:
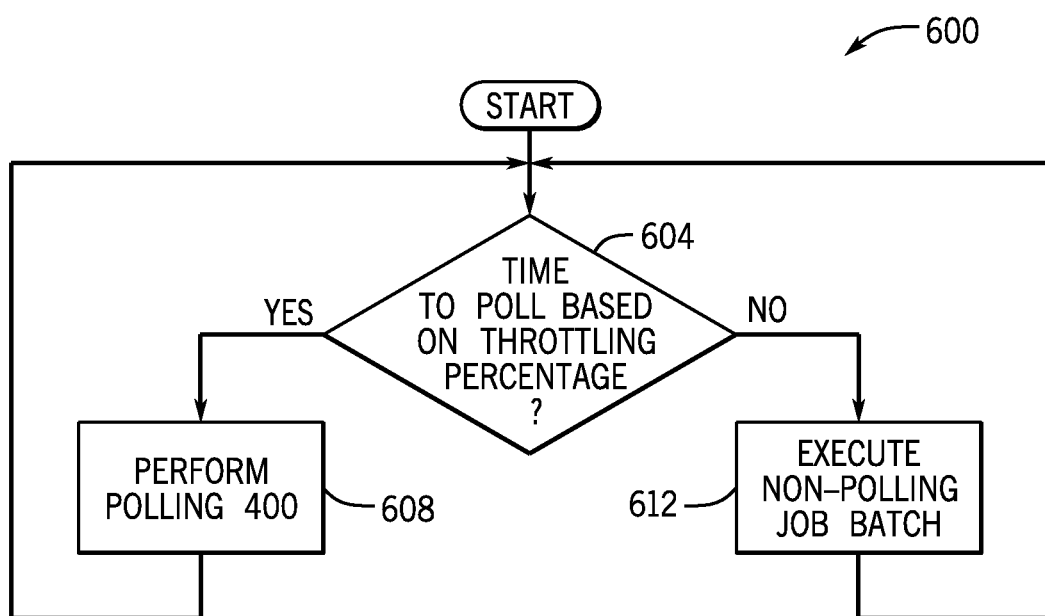
FIG. 6 is a flow diagram depicting a process of a processing core to regulate the polling of hardware devices based on a throttling percentage according to an example implementation.

More specifically, referring to FIG. 6 that depicts an example process 600 that may be performed by a processing core 120 executing instructions stored on at least one machine-readable storage medium. In the example process 600, processing core 120 may perform polling cycles, pursuant to block 608, and execute non-polling job batches, pursuant to block 612. More specifically, the processing core 120 may perform process 400 (FIG. 4) for a particular polling cycle, and, for a particular job cycle, the processing core 120 may retrieve a batch of several jobs (e.g., eight jobs) for one or multiple applications 144 from a job queue and execute the jobs.

For a throttling percentage of zero percent (i.e., no throttling), the processing core 120 executes a polling cycle for every job cycle (i.e., no polling cycles are bypassed). For a throttling percentage of 100 percent, the processing core 120 does not execute polling cycles (i.e., all polling cycles are bypassed). In accordance with example implementations, the throttling percentage is less than 100 percent, which means that the processing core 120 executes at least some polling cycles. As depicted in FIG. 6, the processing core 120 determines (decision block 604) based on a throttling percentage, whether a given polling cycle should be executed; and if so, the processing core 120 executes the polling cycle (block 608). Otherwise, if the processing core 120 determines (decision block 604), based on the throttling percentage, that the polling cycle should be bypassed, then the processing core 120 proceeds to execute another non-polling job batch, pursuant to block 612, before returning to decision block 604.

In accordance with example implementations, the processing core 120 determines its throttling percentage based on a measurement of an overall busy time of the processing core 120 and a measurement of the time that the processing core 120 spends polling. As described further herein, the processing core 120 determines a first degree of throttling (also called a "total utilization-based throttling parameter" herein) based on the measurement of the overall busy time (i.e., non-idle time) of the processing core 120, and the processing core 120 determines a second degree of throttling (also called a "polling utilization-based throttling parameter" herein) based on the measurement of the amount of the overall busy time that the processing core 120 spends polling.

In general, the first degree of throttling tends to be lower (corresponding to less throttling and more polling) when the processing core 120 has a relatively lighter workload and correspondingly has more idle time; and the first degree of throttling tends to be higher (corresponding to more throttling and less polling) when the processing core 120 has a relatively greater workload and correspondingly, less idle time.

The second degree of throttling, in general, tends to be lower (corresponding to less throttling and more polling) when the processing core 120 is spending relatively less time polling; and the second degree of throttling tends to be higher (corresponding to more throttling and less polling) when the processing core 120 is spending relatively more time polling.

In accordance with example implementations, the processing core 120 determines the throttling percentage based on the first degree of throttling and the second degree of throttling. As an example, in accordance with some implementations, the first and second degrees of throttling are percentages; and the processing core 120 sets its throttling percentage to be the greater of the two percentages. Consequently, in accordance with example implementations, the measurements of the overall busy time and polling time produce corresponding throttling recommendations (i.e., the first and second degrees of throttling), and the processing core 120 selects the recommendation of the highest degree of throttling.

More specifically, in accordance with example implementations, the measurement of the overall busy time of the processing core 120 is a past, or historical, measurement of the total utilization of the processing core 120, and based on the total utilization measurement, the processing core 120 determines a total utilization-based throttling parameter, which represents a share (or a percentage) of polling cycles to bypass. In this context, the "total utilization" refers to a measure of the total busy time of the processing core 120, i.e., a measure of the time spent by the processing core 120 when not idle, or stated differently, a measure of the total time spent by the processing core 120 executing instructions in both the user mode and the kernel mode.

In accordance with some implementations, the total utilization may be a percentage of non-idle time of the processing core 120 measured over a measurement window of time. As an example, the processing core 120 may obtain these measurements using operating system calls. The measurement window of time may be a time contiguous "sliding time window" that corresponds to a time interval of a certain duration (e.g., 1.5 wall clock seconds) and has an end time that corresponds to a time at or near the time when the processing core 120 performs the total utilization measurement. Therefore, in accordance with example implementations, the total utilization measurement is a moving average of the total utilization of the processing core 120. The total utilization-based throttling parameter, in accordance with example implementations, tends to be higher (corresponding to more throttling and less polling) for relatively higher total utilizations, and the total utilization-based throttling parameter tends to be lower (corresponding to less throttling and more polling) for relatively lower total utilizations.

In accordance with example implementations, the measurement of the time spent by the processing core 120 polling is a past, or historical, measurement of a polling utilization measurement, and based on the polling utilization measurement, the processing core 120 determines a polling utilization-based throttling parameter, which represents a share (or a percentage) of polling cycles to bypass. In this context, the "polling utilization" refers to a measure of the share of the total busy time (i.e., non-idle time) of the processing core 120, which the processing core 120 spends polling. In accordance with some implementations, the polling utilization may be a percentage of polling time measured over the same sliding time window that is used to measure the total utilization.

Therefore, in accordance with example implementations, the polling utilization measurement is a moving average of the polling utilization. In accordance with example implementations, the processing core 120 may measure the polling utilization using operating system calls. The polling utilization-based throttling parameter, in accordance with example implementations, tends to be higher (corresponding to more throttling and less polling) for relatively higher polling utilizations, and the polling utilization-based throttling parameter tends to be lower (corresponding to less throttling and more polling) for relatively lower polling utilizations.

In accordance with some implementations, the processing core 120 maintains moving averages of the total utilization and polling utilization and updates the moving averages regularly, such as, for example, on a periodic basis (e.g., in response to periodic interrupts) or pursuant to another schedule. Moreover, in accordance with example implementations, each time the processing core 120 updates its total utilization and polling utilization averages based on the new samples of overall busy time and polling time, the processing core 120 re-calculates its throttling percentage based on the updated moving average values.

The processing core 120 may set on upper limit and/or a lower limit on the throttling percentage. For example, in accordance with some implementations, the processing core 120 may set a maximum allowable throttling percentage of 90 percent (i.e., at least ten percent of polling cycles are executed, even for a processing core 120 having a high total utilization and/or high polling utilization), and the processing core 120 may allow the throttling percentage to decrease to zero percent (effectively corresponding to a minimum allowable throttling percentage of zero percent).

In accordance with further implementations, the maximum allowable throttling percentage may be 100 percent, the maximum allowable throttling percentage may be a percentage other than 90 or 100 percent, the minimum allowable throttling percentage may be a percentage other than zero percent, and so forth.

In accordance with some implementations, the processing core 120 may impose the maximum allowable throttling percentage and minimum allowable throttling percentage in the calculations of the total utilization-based throttling parameter and the polling utilization-based throttling parameter, as further described herein.

Figure 7A:
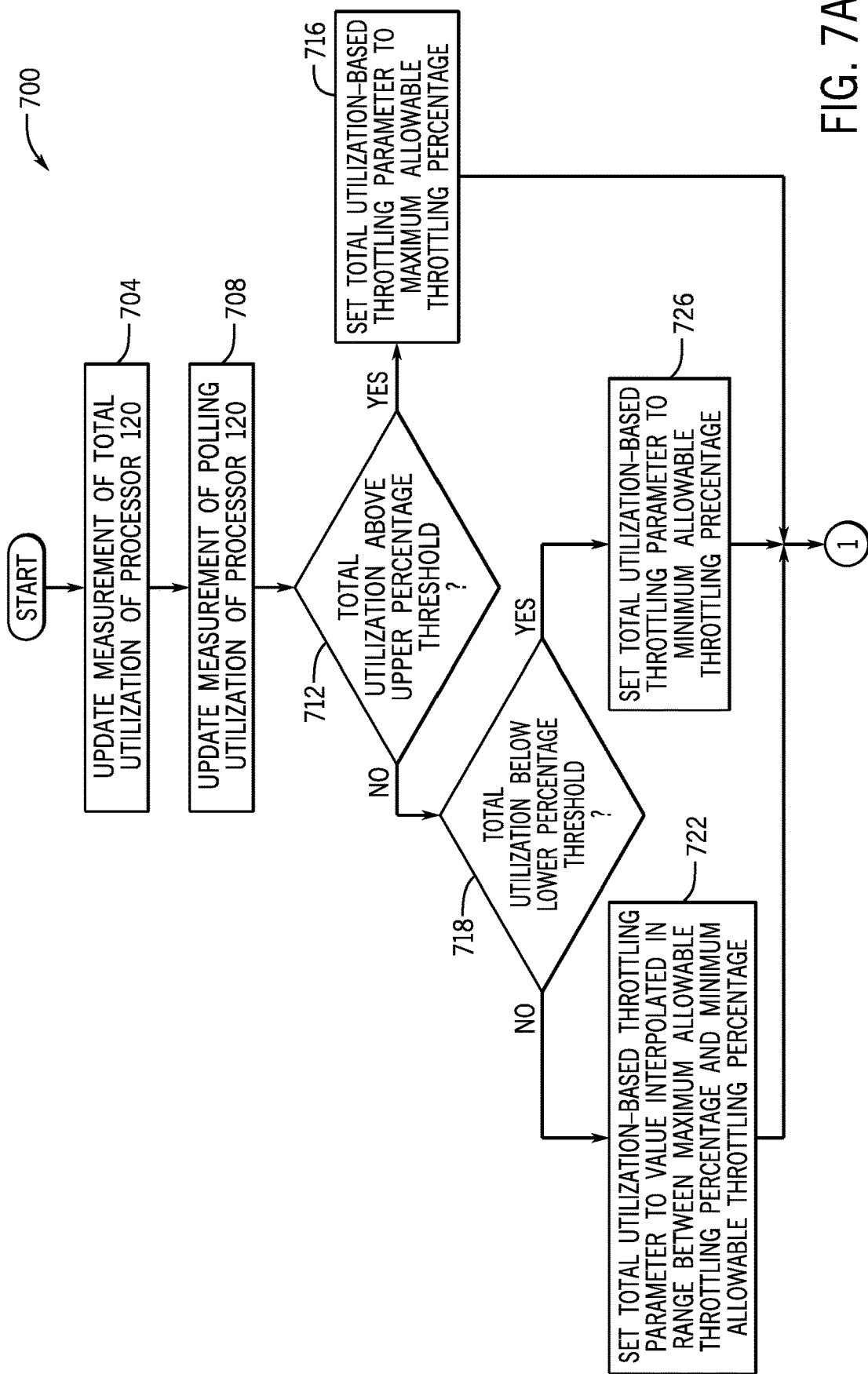
FIGS. 7A and 7B are flow diagrams depicting a process of a processing core to determine a polling throttling percentage based on a core total utilization-based throttling parameter and a core polling utilization-based throttling parameter according to an example implementation.
Figure 7B:
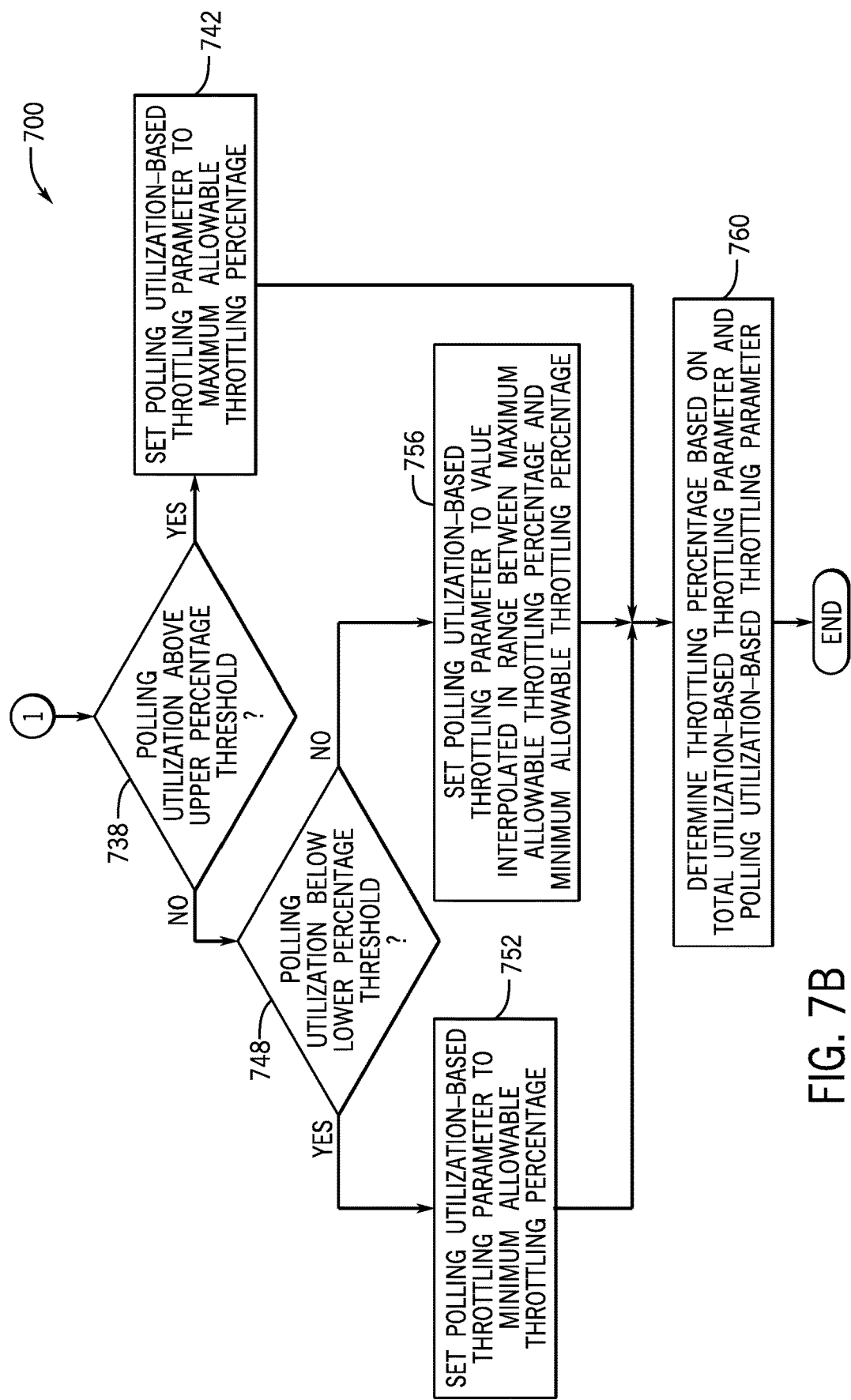

FIGS. 7A and 7B depict an example process 700 that may be performed by a processing core 120 executing instructions stored on at least one machine-readable storage medium. In the example process 700, the processing core 120 may to calculate, or determine, the throttling percentage, in accordance with example implementations. Referring to FIG. 7A in conjunction with FIG. 1, pursuant to the process 700, the processing core 120 updates (block 704) a moving average of the total utilization of the processing core 120 over the most recent time window (e.g., the last 1.5 wall clock seconds) and updates (block 708) a moving average of the polling utilization of the processing core 120 over the most recent time window.

Next, pursuant to the process 700, the processing core 120 determines a total utilization-based throttling parameter based on the measured total utilization. In determining this parameter, the processing core 120 may apply two watermarks, or thresholds: an upper percentage threshold and a lower percentage threshold. The processing core 120 compares (decision block 712) the measured total utilization to the upper percentage threshold to determine whether the measured total utilization is above the upper percentage threshold, and the processing core 120 compares (decision block 718) the measured total utilization to the low percentage threshold to determine whether the measured total utilization is below the lower percentage threshold. If the measured total utilization is above the upper percentage threshold, then the processing core 120 sets the total utilization-based throttling parameter to the maximum allowable throttling percentage, pursuant to block 716. If the measured total utilization is below the lower percentage threshold, then the processing core 120 sets the total utilization-based throttling parameter to the minimum allowable throttling percentage, pursuant to block 726.

If the measured total utilization is between the upper and lower percentage thresholds (i.e., both "No" prongs of decision blocks 712 and 718 are satisfied), then the processing core 120 may, in accordance with example implementations, set (block 722) the total utilization-based throttling parameter to a value that is interpolated in a range between the maximum allowable throttling percentage and the minimum allowable throttling percentage. The interpolation may be a linear interpolation based on the position of the total utilization between the upper percentage threshold and the lower percentage threshold.

As an example of this interpolation, the maximum allowable throttling percentage may be 90 percent, the minimum allowable throttling percentage may be zero percent, the lower percentage threshold may be 65 percent, the upper percentage threshold may be 95 percent, and the total utilization may be 75 percent. A first range between the lower and upper percentage thresholds spans thirty percentage points, and a second range between the maximum and minimum allowable throttling thresholds spans 90 percentage points. The 75 percent total utilization corresponds to one third fourth of the first range, which means that the interpolated value for the utilization-based throttling percentage corresponds to one third of the second range, or an interpolated value of 30 percent. The processing core 120 may use an interpolation other than linear interpolation, in accordance with further implementations.

Referring to FIG. 7B in conjunction with FIG. 1, the processing core 120 may calculate the polling utilization-based throttling parameter as follows, in accordance with example implementations. Similar to the calculation of the total utilization-based throttling parameter, the processing core 120 may compare the measured polling utilization to two watermarks, or thresholds: an upper percentage threshold and a lower percentage threshold. These percentage thresholds may be different than the thresholds used to calculate the total utilization-based throttling parameter.

If the processing core 120 determines (decision block 738) that the measured polling utilization is above the upper percentage threshold, then the processing core 120 sets (block 742) the polling utilization-based throttling parameter to the maximum allowable throttling percentage. If the processing core 120 determines (decision block 748) that the measured total utilization is below the lower percentage threshold, then the processing core 120 sets (block 752) the polling utilization-based throttling parameter to the minimum allowable throttling percentage (or sets the utilization-based throttling parameter to zero percent, if no minimum allowable throttling percentage).

If the measured polling utilization is between the upper and lower percentage thresholds (i.e., both "No" prongs of decision blocks 738 and 748 are satisfied), then the processing core 120 may, pursuant to block 756, interpolate a value for the polling utilization-based throttling parameter in a range between the minimum allowable throttling percentage and the maximum allowable throttling percentage. The interpolation may be a linear interpolation based on the position of the measured polling utilization between the upper percentage threshold and the lower percentage threshold, similar to the interpolation discussed above for the calculation of the total utilization-based throttling parameter. The processing core 120 may use nonlinear interpolation to determine the interpolated value, in accordance with further example implementations.

Pursuant to block 760, the processing core 120 determines the throttling percentage based on the total utilization-based throttling parameter and the polling utilization-based throttling parameter. In accordance with example implementations, the processing core 120 may select the maximum of the two throttling parameters and set the throttling percentage to the selected maximum.

As an example of the processor's determination of the throttling percentage, the maximum allowable throttling percentage may be 90 percent, the minimum allowable throttling percentage may be zero percent, the measured total utilization may be 70 percent, and the measured polling utilization may be 20 percent. For the calculation of the total utilization-based throttling parameter, the processing core 120 uses an upper percentage threshold of 95 percent and a lower percentage threshold of 75 percent. Because the measured total utilization is less than the lower percentage threshold of 75 percent, the processing core 120 sets the utilization-based throttling parameter to the minimum allowable throttling parameter, or zero percent.

For the calculation of the polling utilization-based throttling parameter, the processing core 120 uses an upper percentage threshold of 30 percent and a lower percentage threshold of 10 percent. Because the measured polling utilization of 20 percent is midway between the upper and lower percentage thresholds, the processing core 120 sets the polling utilization-based throttling parameter to the midway point between zero percent (the minimum allowable throttling percentage) and 90 percent (the maximum allowable throttling percent), or 45 percent. Therefore, for this example, the processing core 120 determines the total utilization throttling parameter to be zero percent, and the processing core 120 determines the polling utilization-based throttling parameter to be 45 percent; and the processing core 120 sets the throttling percentage to be the higher of the two parameters, or 45 percent.

Figure 8:
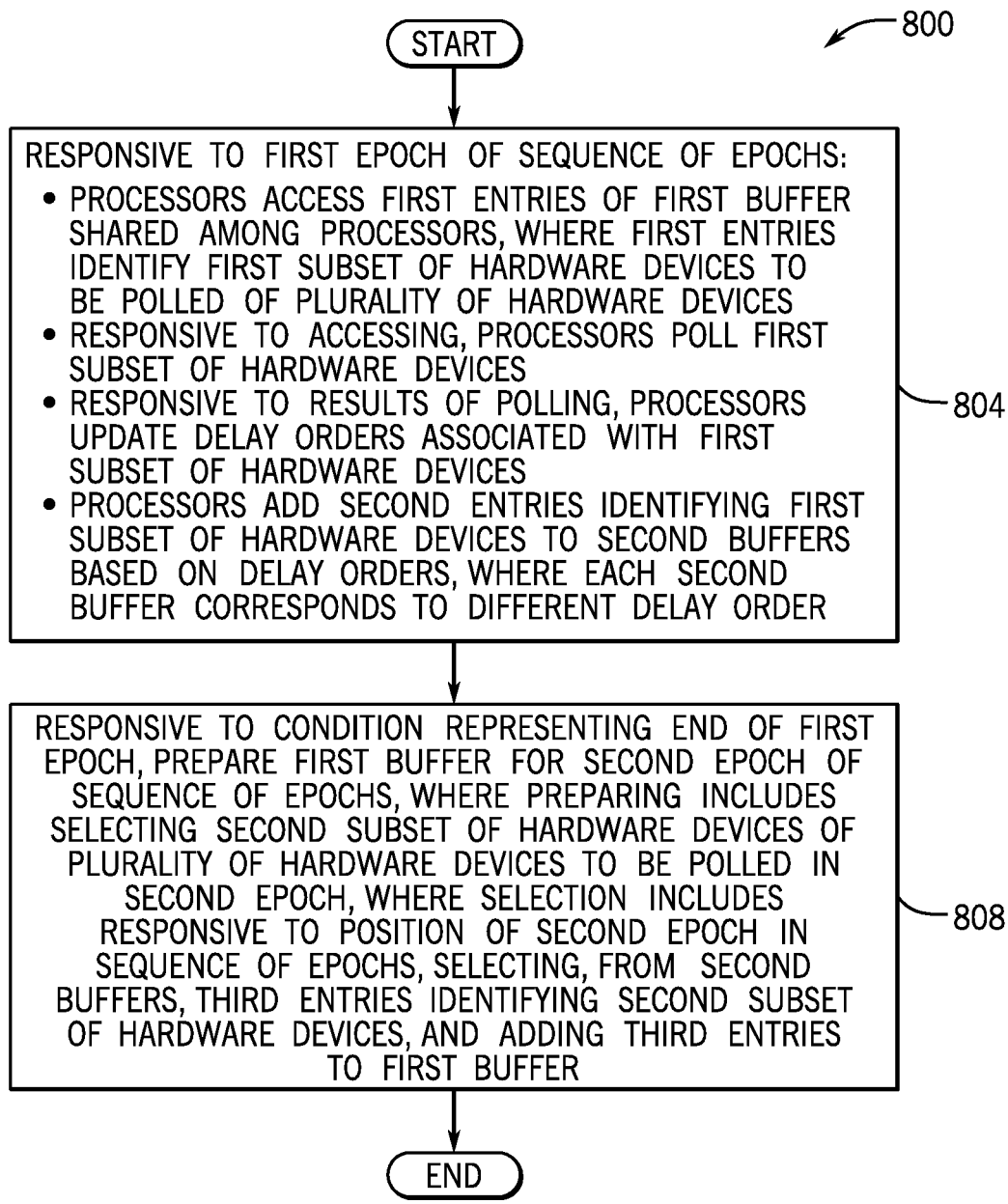
FIG. 8 is a flow diagram depicting a process to poll hardware devices using delay order-associated hardware device identification buffers according to an example implementation.

Referring to FIG. 8, in accordance with example implementations, an example process 800 may be performed by one or more processing cores 120 executing instructions that are stored on at least one machine-readable storage medium. The example process 800 includes, pursuant to block 804, performing several actions responsive to a first epoch of a sequence of epochs. These actions include a plurality of processors accessing first entries of a first buffer that is shared among the plurality of processors. The first entries identify a first subset of hardware devices to be polled of a plurality of hardware devices. The actions further include, responsive to the accessing, the plurality of processors polling the first subset of hardware devices. Moreover, the actions include, responsive to results of the polling, the plurality of processors updating delay orders associated with the first subset of hardware devices; and the plurality of processors adding second entries identifying the first subset of hardware devices to a plurality of second buffers based on the delay orders, where each second buffer of the plurality of second buffers corresponds to a different delay order of the delay orders. The process 800 includes, responsive to a condition that represents an end of the first epoch, preparing (block 808) the first buffer for a second epoch of the sequence of epochs. Pursuant to block 808, the preparation includes selecting a second subset of hardware devices of the plurality of hardware devices. The selection includes, responsive to a position of the second epoch in the sequence of epochs, selecting, from the plurality of second buffers, third entries identifying the second subset of hardware devices and adding the third entries to the first buffer.

Figure 9:
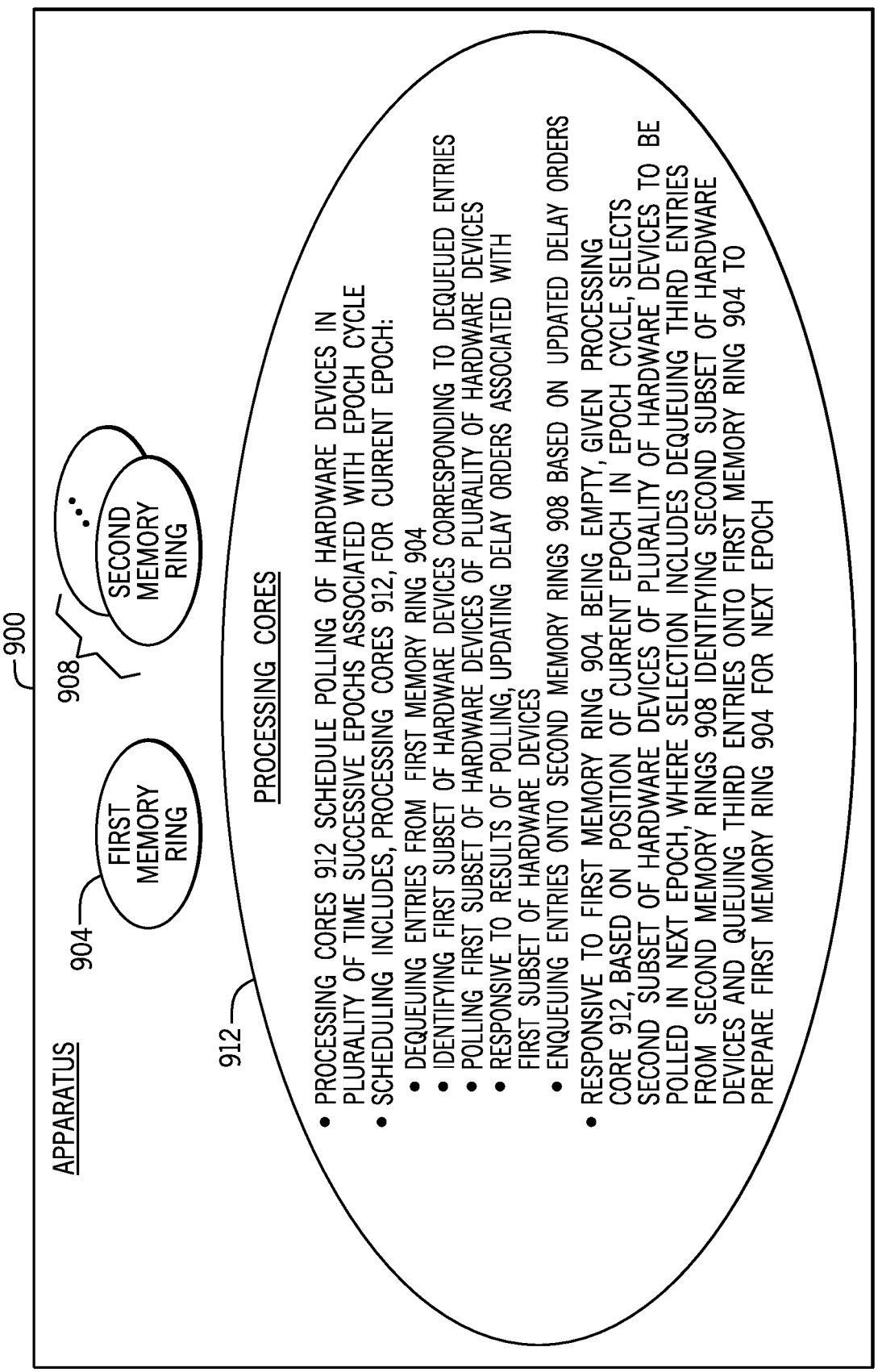
FIG. 9 is a schematic diagram of an apparatus to poll hardware devices using delay order-associated memory rings according to an example implementation.

Referring to FIG. 9, in accordance with example implementations, an apparatus 900 includes a first memory ring 904; a plurality of second memory rings 908; and a plurality of processing cores 912 to execute instructions, stored on at least one machine-readable storage medium, to perform the functions described herein in relation to FIG. 9. Each second memory ring 908 is associated with a delay order of a plurality of delay orders. The plurality of processing cores 912 share access to the first memory ring 904, share access to the plurality of second memory rings 908, and schedule polling of a plurality of hardware devices by the plurality of processing cores 912 in a plurality of time successive epochs that are associated with an epoch cycle. The scheduling includes, for a current epoch of the plurality of time successive epochs, the plurality of processing cores 912 dequeuing entries from the first memory ring 904; identifying a first subset of hardware devices of a plurality of hardware devices corresponding to the dequeued entries; polling the first subset of hardware devices; responsive to results of the polling, updating delay orders that are associated with the first subset of hardware devices; and enqueueing entries onto the plurality of memory rings 904 based on the updated delay orders. Responsive to the first memory ring 904 being empty, a given processing core 912 selecting a second subset of hardware devices of the plurality of hardware devices for a next epoch of the plurality of epochs. The selection includes the given processing core 912, based on a position of the current epoch in the epoch cycle, dequeuing third entries from the plurality of second memory rings 904 identifying the second subset of hardware devices and dequeuing the third entries onto the first memory ring 904 to prepare the first memory ring 904 for the next epoch.

Figure 10:
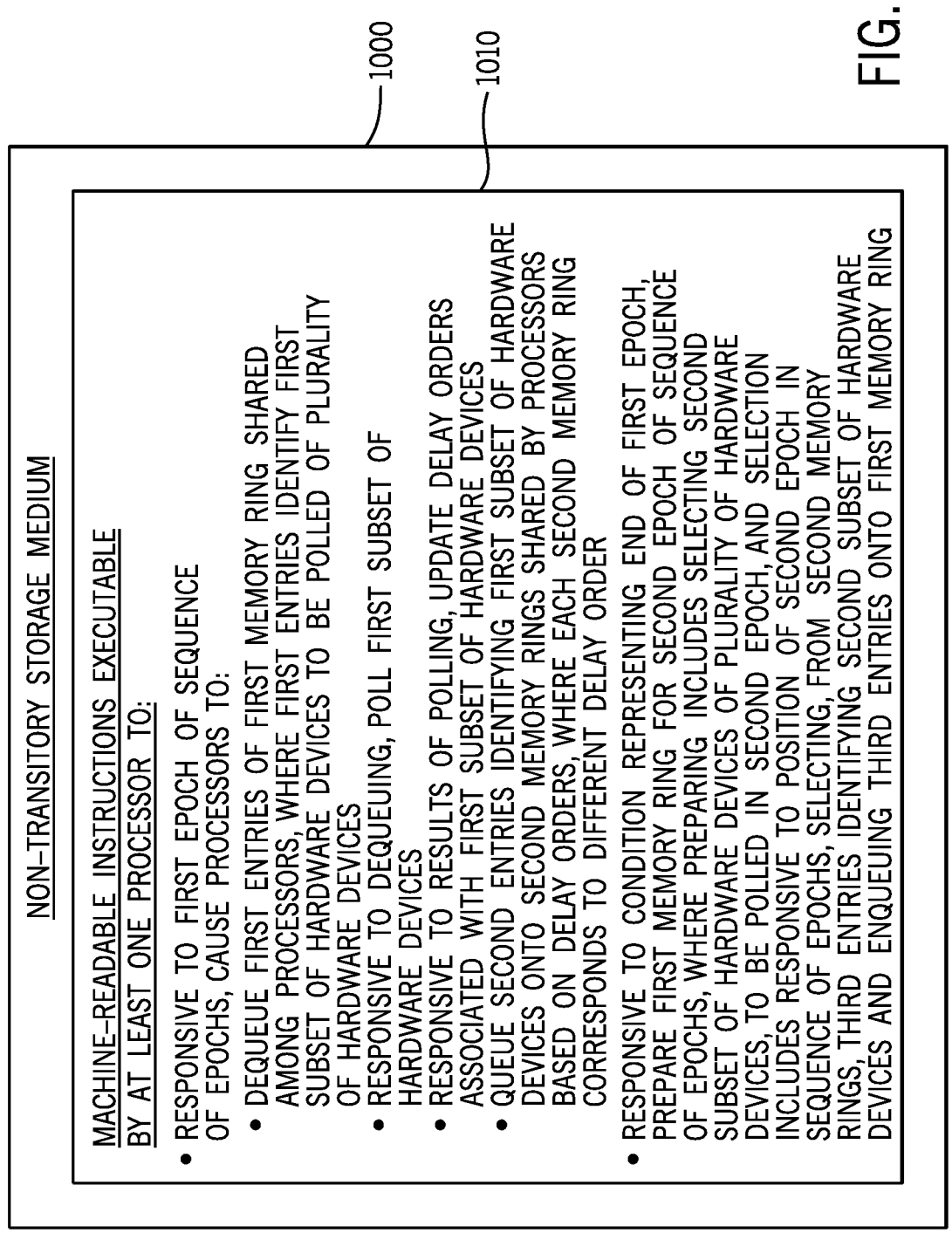
FIG. 10 is an illustration of a non-transitory storage medium that stores machine-readable instructions that, when executed by at least one processor, cause the processor(s) to poll hardware devices using delay order-associated memory rings according to an example implementation.

Referring to FIG. 10, in accordance with example implementations, a non-transitory storage medium 1000 stores machine-readable instructions 1010 that, when executed by at least one processor, cause the processor(s) to, responsive to a first epoch of a sequence of epochs, cause a plurality of processors to dequeue first entries of a first memory ring that is shared among the plurality of processors. The first entries identify a first subset of hardware devices to be polled of a plurality of hardware devices. The instructions 1010, when executed by the processor(s), further cause the processor(s) to, responsive to the first epoch, and responsive to the dequeuing, poll the first subset of hardware devices. Moreover, the instructions 1010, when executed by the processor(s), further cause the processor(s) to, responsive to the first epoch, and responsive to results of the polling, update delay orders that are associated with the first subset of hardware devices. The instructions 1010, when executed by the processor(s), further cause the processor(s) to, responsive to the first epoch, queue second entries identifying the first subset of hardware devices onto a plurality of memory rings that are shared by the plurality of processors based on the delay orders. Each second ring of the plurality of second memory rings corresponds to a different delay order of the delay orders. The instructions 1010, when executed by the processor(s), further cause the processor(s) to, responsive to a condition representing an end of the first epoch, prepare the first memory ring for a second epoch of the sequence of epochs. The preparation of the first memory ring includes selecting a second subset of hardware devices of the plurality of hardware devices. The selection includes, selecting, from the plurality of second memory rings, third entries identifying the second subset of hardware devices and enqueuing the third entries onto the first memory ring.

In accordance with example implementations, updating delay orders associated with the first subset of hardware devices includes, for a given hardware device of the first subset of hardware devices, determining, based on the polling of the given hardware device, whether the given hardware device has work; and modifying the delay order associated with the given hardware device based on the result of the determination of whether the given hardware device has work. A particular advantage is that hardware devices that have work may be assigned delay orders that cause the hardware devices to be polled more frequently and hardware devices that do not have work may be assigned delay orders that cause these hardware devices to be polled less frequently.

In accordance with example implementations, modifying the delay order includes modifying the delay order responsive to a number of successive pollings of the given hardware device providing representations that the given hardware device does not have work. A particular advantage is that hardware devices that do not repeatedly have work may be assigned delay orders that cause the hardware devices to be polled less frequently.

In accordance with example implementations, the first buffer may be a first memory ring shared by the plurality of processors, and the second buffers may be a plurality of second rings that are shared by the plurality of processors. A particular advantage is that lock-free data structures may be used to allow multiple accesses of polling information.

In accordance with example implementations, the condition represents that the first buffer is empty, and the method further includes a given processor determining that the first buffer is empty; setting a lock on the first buffer; identifying a set of at least one second buffer associated with the position of the second epoch; retrieving the third entries from the set of the second buffer(s); adding data to the first buffer representing the third entry; and releasing the lock on the first buffer. A particular advantage is that for a set of buffers shared by a plurality of processors, any given processor may, upon recognizing that a current buffer is dequeued, or empty, may take on the role of preparing the buffer for the next epoch.

In accordance with example implementations, identifying the set of at least one second buffer includes causing an index to have a first index value; and identifying a second buffer of at least one second buffer based on the first index value and an identifier for the first epoch, where the identifier represents the position of the first epoch in the sequence of epochs. A particular advantage is that an identifier for the epochs, such as an epoch index, may be used to identify corresponding second buffers to be used with the epoch.

In accordance with example implementations, identifying the set of at least one second buffer further includes causing the index to have a second index value; and identifying another second buffer based on the second index value and the identifier for the first epoch. A particular advantage is that an identifier for an epoch, such as an index, may be used to identify multiple second buffers.

In accordance with example implementations, preparing the first buffer for the second epoch further includes increasing or decreasing a number of entries of the first buffer. A particular advantage is that a size of the first buffer may be variable and thus, self-tuning, to adjust for an increase in the number of hardware devices having work or a decrease in the number of hardware devices having work.

In accordance with example implementations, at least one processor (of the plurality of processors) performs a batch of non-polling work in a time after an end of the first epoch and before a beginning of the second epoch. A particular advantage is that processors may be used for both polling and work execution.

In accordance with example implementations, the first buffer includes a first memory ring; and the second buffers include second memory rings. The plurality of processors accessing the first entries of the first buffer includes a given processor dequeuing a first entry of the first entries from the first memory ring; and the plurality of processors updating the delay orders includes the given processor, responsive to a given hardware device of the first subset of hardware devices having work, setting the delay order associated with the given hardware device to a value that corresponds to a minimum delay value from a range of values including the minimum delay value and larger delay values. The plurality of processors adding the second entries includes the given processor enqueuing a second entry of the second entries corresponding to the given hardware device onto a second memory ring of the plurality of second memory rings corresponding to the minimum delay value. A particular advantage is that hardware devices having work may be assigned delay orders that cause the hardware devices to be polled more frequently.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    responsive to a first epoch of a sequence of epochs:
        a plurality of processors accessing first entries of a first buffer shared among the plurality of processors, wherein the first entries identify a first subset of hardware devices to be polled of a plurality of hardware devices;
        responsive to the accessing, the plurality of processors polling the first subset of hardware devices;
        responsive to results of the polling, the plurality of processors updating delay orders associated with the first subset of hardware devices; and
        the plurality of processors adding second entries identifying the first subset of hardware devices to a plurality of second buffers based on the delay orders, wherein each second buffer of the plurality of second buffers corresponds to a different delay order of the delay orders; and
    responsive to a condition representing an end of the first epoch, preparing the first buffer for a second epoch of the sequence of epochs, wherein the preparing comprises, responsive to a position of the second epoch in the sequence of epochs, selecting a second subset of hardware devices of the plurality of hardware devices for the second epoch, and wherein the selecting comprises selecting, from the plurality of second buffers, third entries identifying the second subset of hardware devices and adding the third entries to the first buffer.

2. The method of claim 1, wherein updating delay orders associated with the first subset of hardware devices comprises:
    for a given hardware device of the first subset of hardware devices, determining, based on the polling of the given hardware device whether the given hardware device has work; and
    modifying the delay order associated with the given hardware device based on a result of the determination of whether the given hardware device has work.

3. The method of claim 2, wherein modifying the delay order comprises modifying the delay order responsive to a number of successive pollings of the given hardware device resulting in representations that the given hardware device does not have work.

4. The method of claim 1, wherein:
    the plurality of processors accessing the first entries of the first buffer comprises the plurality of processors accessing a first memory ring shared by the plurality of processors; and
    the plurality of processors adding second entries identifying the first subset of hardware devices to the plurality of second buffers comprises the plurality of processors accessing a plurality of second memory rings other than the first memory ring, wherein the plurality of second memory rings are shared by the plurality of processors.

5. The method of claim 1, wherein preparing the first buffer for the second epoch further comprises:
   identifying a set of at least one delay order of the delay orders corresponding to the position of the second epoch;
   selecting at least one second buffer of the plurality of second buffers corresponding to the set of at least one delay order; and
   retrieving the third entries from the at least one second buffer.

6. The method of claim 1, wherein the condition represents that the first buffer is empty, the method further comprising a given processor of the plurality of processors:
   determining that the first buffer is empty;
   setting a lock on the first buffer;
   identifying a set of at least one second buffer of the plurality of second buffers associated with the position of the second epoch;
   retrieving the third entries from the set of at least one second buffer;
   adding data to the first buffer representing the third entries; and
   releasing the lock on the first buffer.

7. The method of claim 6, wherein identifying the set of at least one second buffer comprises:
   causing an index to have a first index value; and
   based on the first index value and an identifier for the first epoch, identifying a second buffer of the set of at least one second buffer, wherein the identifier represents the position of the first epoch in the sequence of epochs.

8. The method of claim 7, wherein identifying the set of at least one second buffer further comprises:
   causing the index to have a second index value; and
   identifying another second buffer of the set of at least one second buffer based on the second index value and the identifier for the first epoch.

9. The method of claim 1, wherein preparing the first buffer for the second epoch further comprises increasing or decreasing a number of entries of the first buffer.

10. The method of claim 1, further comprising at least one processor of the plurality of processors performing a batch of non-polling work in a time after an end of the first epoch and before a beginning of the second epoch.

11. The method of claim 1, wherein:
   the first buffer comprises a first memory ring;
   the plurality of second buffers comprise a plurality of second memory rings;
   the plurality of processors accessing first entries of the first buffer comprises a given processor of the plurality of processors dequeuing a given first entry of the first entries from the first memory ring;
   the plurality of processors updating the delay orders comprises the given processor, responsive to a given hardware device of the first subset of hardware devices having work, setting the delay order associated with the given hardware device to a value corresponding to a minimum delay value from a range of values comprising the minimum delay value and larger delay values; and
   the plurality of processors adding the second entries comprises the given processor enqueuing a second entry of the second entries corresponding to the given hardware device onto a second memory ring of the plurality of second memory rings corresponding to the minimum delay value.

12. An apparatus comprising:
   a first memory ring;
   a plurality of second memory rings, wherein each second memory ring of the plurality of second memory rings is associated with a delay order of a plurality of delay orders; and
   a plurality of processing cores to execute instructions to share access to the first memory ring, share access to the plurality of second memory rings, and schedule polling of a plurality of hardware devices by the plurality of processing cores in a plurality of time successive epochs that are associated with an epoch cycle;
   wherein:
      the scheduling comprises, for a current epoch of the plurality of time successive epochs, the plurality of processing cores to execute instructions to:
         dequeue entries from the first memory ring;
         identify a first subset of hardware devices of the plurality of hardware devices corresponding to the dequeued entries;
         poll the first subset of hardware devices;
         responsive to results of the polling, update delay orders associated with the first subset of hardware devices; and
         enqueue entries onto the plurality of second memory rings based on the updated delay orders; and
      responsive to the first memory ring being empty, a given processing core of the plurality of processing cores to execute instructions to select a second subset of hardware devices of the plurality of hardware devices for the next epoch of the plurality of epochs, wherein the selecting comprises, based on a position of the current epoch in the epoch cycle, dequeuing third entries from the plurality of second memory rings identifying the second subset of hardware devices and queueing the third entries onto the first memory ring to prepare the first memory ring for the next epoch.

13. The apparatus of claim 12, further comprising a plurality of non-uniform memory access (NUMA) nodes, wherein the plurality of NUMA nodes comprises a NUMA node comprising the plurality of processing cores.

14. The apparatus of claim 12, wherein:
   the current epoch corresponds to a plurality of polling cycles by the plurality of processing cores; and
   the plurality of processing cores execute instructions to perform a plurality of job cycles associated with a plurality of jobs during the current epoch.

15. The apparatus of claim 12, wherein the plurality of processing cores polling the first subset of hardware devices comprises the plurality of processing cores executing instructions to poll at least one of a storage device or a storage node.

16. The apparatus of claim 12, wherein a given processing core of the plurality of processing cores, executes instructions to, responsive to a result of polling a given hardware device of the first subset of hardware devices, determine that the given hardware device is inactive and bypasses adding an entry for the given hardware device to the plurality of second memory rings.

17. A non-transitory storage medium storing machine-readable instructions executable by at least one processor to:
   responsive to a first epoch of a sequence of epochs, cause a plurality of processors to:
      dequeue first entries of a first memory ring shared among the plurality of processors, wherein the first entries identify a first subset of hardware devices to be polled of a plurality of hardware devices;

responsive to the dequeuing, poll the first subset of hardware devices;

responsive to results of the polling, update delay orders associated with the first subset of hardware devices; and queue second entries identifying the first subset of hardware devices onto a plurality of memory rings shared by the plurality of processors based on the delay orders, wherein each second memory ring of the plurality of second memory rings corresponds to a different delay order of the delay orders; and responsive to a condition representing an end of the first epoch, prepare the first memory ring for a second epoch of the sequence of epochs, wherein the preparing comprises, responsive to a position of the second epoch in the sequence of epochs, selecting a second subset of hardware devices of the plurality of hardware devices for second epoch, and wherein the selecting comprises selecting, from the plurality of second memory rings, third entries identifying the second subset of hardware devices and queuing the third entries onto the first memory ring.

18. The storage medium of claim 17, wherein the instructions, when executed by the at least one processor, further cause the at least one processor to:

for a given hardware device of the first subset of hardware devices, determine, based on the polling of the given hardware device whether the given hardware device has work; and modify the delay order associated with the given hardware device based on a result of the determination of whether the given hardware device has work.

19. The storage medium of claim 18, wherein the instructions, when executed by the at least one processor, further cause the at least one processor to modify the delay order associated with the given hardware device based on whether the given hardware device responded to a number of successive pollings of the given hardware device with representations that the given hardware device does not have work.

20. The storage medium of claim 17, wherein the condition represents that the first buffer is empty, and the instructions, when executed by the at least processor, further cause the at least one processor to:

determine that the first buffer is empty;

set a lock on the first buffer;

identify a set of at least one second buffer of the plurality of second buffers associated with the position of the second epoch;

retrieve the third entries from the set of at least one second buffer;

add data to the first buffer representing the third entries; and release the lock on the first buffer.

* * * * *